(12) United States Patent
Knoblach et al.

(10) Patent No.: US 6,628,941 B2
(45) Date of Patent: *Sep. 30, 2003

(54) AIRBORNE CONSTELLATION OF COMMUNICATIONS PLATFORMS AND METHOD

(75) Inventors: Gerald M. Knoblach, Chandler, AZ (US); Eric A. Frische, Plano, TX (US)

(73) Assignee: Space Data Corporation, Chandler, AZ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,440

(22) Filed: Jun. 29, 1999

(65) Prior Publication Data

US 2002/0072361 A1 Jun. 13, 2002

(51) Int. Cl.$^7$ .................................................. H04Q 7/20
(52) U.S. Cl. ........................................ 455/431; 455/436
(58) Field of Search ............................. 455/12.1, 13.1, 455/427, 430, 431, 11.1, 436; 244/158 R, 24, 31

(56) References Cited

U.S. PATENT DOCUMENTS

| | | | |
|---|---|---|---|
| 2,151,336 A | 3/1939 | Scharlau | 250/11 |
| 2,366,423 A | 1/1945 | Pear, Jr. | 250/33 |
| 2,462,102 A | 2/1949 | Istvan | 343/18 |
| 2,542,823 A | 2/1951 | Lyle | 250/15 |
| 2,598,064 A | 5/1952 | Lindenblad | 250/15 |
| 2,626,348 A | 1/1953 | Nobles | 250/15 |
| 3,030,500 A | 4/1962 | Katzin | 250/6 |
| 3,030,509 A | 4/1962 | Carlson | 250/71.5 |
| 3,045,952 A | 7/1962 | Underwood | 244/33 |
| 3,174,705 A | 3/1965 | Schiff et al. | 244/1 |
| 3,206,749 A | 9/1965 | Chatelain | 343/18 |
| 3,384,891 A | 5/1968 | Anderson | 343/6.5 |
| 3,404,278 A | 10/1968 | Chope | 250/199 |
| 3,471,856 A | 10/1969 | Laughlin, Jr. et al. | 343/6 |
| 3,555,552 A | 1/1971 | Alford | 343/726 |
| 3,674,225 A * | 7/1972 | Johnson | 244/31 |
| 3,742,358 A | 6/1973 | Cesaro | 325/3 |
| 3,781,893 A | 12/1973 | Beukers et al. | 343/702 |
| 3,781,894 A | 12/1973 | Ancona et al. | 343/706 |
| RE28,725 E | 2/1976 | Hutchinson et al. | 343/100 ST |
| 4,249,181 A | 2/1981 | Espitalie et al. | 343/100 |
| 4,262,864 A | 4/1981 | Eshoo | 244/31 |

(List continued on next page.)

FOREIGN PATENT DOCUMENTS

| | | | |
|---|---|---|---|
| GB | 2 216 319 | | 10/1989 |
| WO | WO 95/04407 | * | 2/1995 |
| WO | WO 96/02094 | | 1/1996 |

OTHER PUBLICATIONS

David A Brown"Balloon Technology Offers High–Altitude Applications," pp. 56–_(2 pages).
*Aviation Week & Space Technology*/Nov. 16, 1992 ;and, *Compton's Interactive Encyclopedia*, excerpt, 5 pages (1993, 1994).

Primary Examiner—Nguyen T. Vo
(74) Attorney, Agent, or Firm—Morrison & Foerster LLP

(57) ABSTRACT

An airborne constellation is disclosed with a plurality of individual lighter-than-air platforms spaced apart above a contiguous geographic area within a predetermined altitude range so that ubiquitous line of sight coverage of the geographic area is provided. Each of the plurality of platforms include an enclosure holding a regulated volume of low density gas for buoyancy of the platforms. Each of the plurality of platforms further includes a signal transmitting device attached to the enclosure by which signals from the platform may be transmitted to the contiguous geographic area.

73 Claims, 14 Drawing Sheets

U.S. PATENT DOCUMENTS

| | | | |
|---|---|---|---|
| 4,394,780 A | 7/1983 | Mooradian | 455/618 |
| 4,419,766 A | 12/1983 | Goeken et al. | 455/62 |
| 4,472,720 A | 9/1984 | Reesor | 343/388 |
| 4,481,514 A | 11/1984 | Beukers et al. | 340/870.1 |
| 4,509,053 A | 4/1985 | Robin et al. | 343/708 |
| 4,595,928 A | 6/1986 | Wingard | 343/742 |
| 4,696,052 A | 9/1987 | Breeden | 455/51 |
| 4,747,160 A | 5/1988 | Bossard | 455/33 |
| 4,868,577 A | 9/1989 | Wingard | 343/713 |
| 4,979,170 A | 12/1990 | Gilhousen et al. | 370/104.1 |
| 4,995,572 A | 2/1991 | Piasecki | 244/2 |
| 5,067,172 A | 11/1991 | Schloemer | 455/34 |
| 5,119,397 A | 6/1992 | Dahlin et al. | 375/5 |
| 5,121,128 A | 6/1992 | Lidth de Jeude et al. | 343/741 |
| 5,123,112 A | 6/1992 | Choate | 455/56.1 |
| 5,175,556 A | 12/1992 | Berkowitz | 342/354 |
| 5,189,734 A | 2/1993 | Bailey et al. | 455/33.2 |
| 5,204,970 A | 4/1993 | Stengel et al. | 455/69 |
| 5,212,804 A | 5/1993 | Choate | 455/33.1 |
| 5,214,789 A | 5/1993 | George | 455/33.2 |
| 5,235,633 A | 8/1993 | Dennison et al. | 379/60 |
| 5,239,668 A | 8/1993 | Davis | 455/12.1 |
| 5,287,541 A | 2/1994 | Davis et al. | 455/12.1 |
| 5,327,572 A | 7/1994 | Freeburg | 455/13.1 |
| 5,345,448 A * | 9/1994 | Keskitalo | 370/331 |
| 5,420,592 A | 5/1995 | Johnson | 342/357 |
| 5,430,656 A | 7/1995 | Dekel et al. | 21/20 |
| 5,433,726 A | 7/1995 | Horstein et al. | 244/158 R |
| 5,439,190 A | 8/1995 | Horstein et al. | 244/158 R |
| 5,444,762 A | 8/1995 | Frey et al. | 379/58 |
| 5,455,823 A * | 10/1995 | Noreen et al. | 455/12.1 |
| 5,467,681 A | 11/1995 | Liberman | 89/1.11 |
| 5,471,641 A | 11/1995 | Dosiere et al. | 455/13.1 |
| 5,519,761 A | 5/1996 | Gilhousen | 379/59 |
| 5,533,029 A | 7/1996 | Gardner | 370/94.1 |
| 5,557,656 A | 9/1996 | Ray et al. | 379/59 |
| 5,559,865 A | 9/1996 | Gilhousen | 379/60 |
| 5,584,047 A | 12/1996 | Tuck | 455/13.1 |
| 5,615,409 A * | 3/1997 | Forssen et al. | 455/440 |
| 5,645,248 A | 7/1997 | Campbell | 244/30 |
| 5,748,620 A | 5/1998 | Capurka | 370/328 |
| 5,759,712 A | 6/1998 | Hockaday | 429/30 |
| 5,788,187 A | 8/1998 | Castiel et al. | 244/158 |
| 5,832,380 A * | 11/1998 | Ray et al. | 455/431 |
| 5,835,059 A * | 11/1998 | Nadel et al. | 342/37 |
| 5,909,299 A * | 6/1999 | Sheldon et al. | 359/159 |
| 6,061,562 A * | 5/2000 | Martin et al. | 455/431 |
| 6,167,263 A | 12/2000 | Campbell | 455/431 |
| 6,324,398 B1 * | 11/2001 | Lanzerotti et al. | 455/431 |
| 2001/0004583 A1 | 6/2001 | Uchida | 7/14 |

\* cited by examiner

AIRBORNE CONSTELLATION OF COMMUNICATIONS PLATFORMS AND METHOD

TECHNICAL FIELD OF THE INVENTION

The present invention relates to a constellation of small, airborne communications platforms, and more particularly, to a plurality of small, lighter-than-air communications platforms spaced-apart and floating in the stratospheric layer of the Earth's atmosphere over a contiguous geographic area.

BACKGROUND OF THE INVENTION

Until recently, all communications satellites were located on one orbit called the geosynchronous arc, which is located 22,300 miles above the Earth's equator. Since international treaties required satellites to be spaced two degrees apart, there were only 180 sites on geosynchronous orbit. An optimally-designed three-stage chemical rocket typically must be 94% propellant at launch to reach geosynchronous orbit, which, after allocating about 5.6% of the weight for the rocket, only leaves about 0.4% of the initial launch weight for the satellite. To put this in perspective, a typical 3,000 lb. automobile with the same performance would only be able to carry one 200 lb. person, would need a 8,400 gallon fuel tank, and would be junked after one trip! Finally, although the NASA space shuttle can service a few very low orbit satellites at great expense, most satellites cannot be serviced or upgraded after being launched.

Currently, since there are a limited number of sites on the geosynchronous orbit, geosynchronous satellites are growing in size and performance, now being able to broadcast television signals directly to homes. Recently, additional satellite networks have been deployed that do not require a geosynchronous orbit. All of these new networks have launched smaller communications satellites into much lower orbits where there are an unlimited number of sites. Because the satellites required for a network are more numerous and because the satellites are smaller, up to 8 satellites per rocket have been launched. Although satellites have become smaller and more numerous, there are still no "personal satellites" and no mass producers of consumer products in the satellite industry today.

It might be estimated that a network of microsatellites in low Earth orbit and ground equipment to accommodate the tracking, transmission, reception, signal handoff among the plurality of microsatellites and necessary system network for a voice system would cost at least $3 billion to deploy. Within four years of deploying a system, each one of five million subscribers might be expected to invest as much as $3,000 in the equipment, which results in a total combined investment by the users in the new equipment of about $15 billion. The cost of deploying a smaller system of low Earth orbit advanced messaging satellites might be estimated at about $475 million. Such a system might be expected to serve two to three million subscribers, each with user equipment costing $300–$ 1,000. Thus, the total investments by the users for their equipment may be at least $600 million.

There is currently an industry involving radiosondes for purposes of gathering weather information. Radiosondes are the instrument packages launched on weather balloons to gather weather data. Radiosondes are launched from a network of sites around the world at noon and at midnight Greenwich Mean Time each day. The weather service radiosondes collect temperature, humidity, pressure and wind data as they rise from the surface of the Earth to approximately 100,000 feet during a two-hour flight. This data is then input in atmospheric models that are run on supercomputers. The information gathered from the network of ascending radiosondes is critical in predicting the weather. Most countries of the world are bound by treaty to launch radiosondes from designated sites and to share the data with other countries. Currently there are about 800,000 radiosondes launched each year throughout the world. This number represents the 997 global weather stations launching two radiosondes per day, 365 days per year (727,000) plus a small number of radiosondes launched for military and research purposes. About 18% of radiosondes are recovered, reconditioned and reclaimed, resulting in new production of about 650,000 weather-gathering radiosondes per year.

The location systems currently used to track weather balloons are either being deactivated (Omega, beginning before the year 2000, and Loran-C, shortly after the year 2000) or are so old that the operation and maintenance is becoming prohibitively expensive (radars and radiotheodolites). Changes in radiosonde systems are usually very slow, since meteorologists study climatic trends by comparing data collected over decades. Thus, they are very leery of any changes that may introduce new biases into data as it is collected. This is evident from the fact that major users, like the U.S. National Weather Service (NWS) still use analogue radiosondes tracked by radiotheodolites when digital, navaid sondes have been around for many years. Tightening of governmental budgets have made some users unable to pay for new technology required. There presently is a push in the sonde marketplace to convert to using the Global Positioning System (GPS) for wind tracking on radiosondes. From 1995 to 1998, the NWS tried and failed to get the U.S. Congress to fund a program to develop a GPS tracking system for the U.S. Observation Network. This inability to obtain the necessary newer technology to replace old and unsupportable radiosonde infrastructure is occurring simultaneously with the reallocation of the radiosonde's RF spectrum to commercial uses. Radiosondes have traditionally transmitted at 400 MHZ for navaid sondes and 1680 MHZ for radiotheodolite sondes. The 400 MHZ band may be auctioned off by the Federal Communications Commission (FCC) in the United States for simultaneous use by commercial services. Thus, interference is increasing and sondes may be forced to use narrower bandwidths with digital downlinks instead of the wide bands with analogue downlinks still in common use.

Very large and expensive NASA balloons have been individually launched and maintained at a floating altitude for extended periods of time. These balloons carry hundreds of pounds of equipment and cost tens of thousands of dollars each. The single balloons do not have the capability of line-of-sight continuous coverage of extended geographic areas because of drifting.

Personal communications services (PCS) is a new category of digital services that the FCC started auctioning spectrum for in 1994. PCS is split into two categories: broad band and narrow band PCS. The broad band category is primarily for voice services and PCS broad band phones now compete with traditional cellular phones. The narrow band category is for advanced messaging, which is essentially two-way paging. The paging industry sees advanced messaging as being the mobile extension of one's e-mail account, just as a cellular phone has been the mobile extension of one's desktop phone. Nationwide narrow band PCS (NPCS) was the first spectrum ever auctioned by the FCC. About 30 regional and nationwide NPCS licenses have been auctioned and sold to private commercial ventures. The fact that the spectrum was auctioned is significant in that there are fewer restrictions on the use of this spectrum than on the use of traditional spectrum licensed from the FCC. Before auctions, the FCC granted spectrum on a piecemeal basis, and companies had to prove that they were using the airwaves for the "public good." Usually there was very specific federal regulation on how the frequency could be used. Since companies paid for their PCS licenses, they essentially own the spectrum. The FCC imposed only minimal regulations to prevent systems from interfering with other carriers' and other countries' systems. Additionally, the FCC and Industry Canada reached what is known as a Terrestrial Radio Communication Agreement and Arrangement in which Canada allocated the same frequencies for NPCS with the same channel structure as the auctioned spectrum for the NPCS in the United States. This made cross-boarder NPCS possible and in 1996, at least one paging system company was granted an NPCS license in Canada to operate on the same frequencies as its U.S. licensee. Mexico also has specified the same channel spacing as used in the United States.

One of the goals of the FCC is to encourage providing radio frequency (RF) communications services to consumers in rural areas at an affordable price. This market has been largely ignored by the larger communications companies because of the diminishing return on investment in providing wireless communications to sparsely populated areas. These wireless services include paging, advanced messaging, telemetry, voice, etc. Although both voice and messaging services are available to rural areas using satellite systems, the costs are generally in the thousands of dollars per unit and well out of reach of most consumers. In addition satellite systems have problems providing services in urban areas because they lack the signal strength necessary for providing building penetration.

OBJECTS AND ADVANTAGES OF THE INVENTION

The present invention overcomes drawbacks of prior communications satellites, by using small and relatively inexpensive microelectronics to incorporate most of the functions provided by existing communications satellites in small, lighter-than-air communications platforms. In particular, a plurality of lighter-than-air balloons forming a constellation are designed to carry microelectronic communications equipment into a layer of the Earth's atmosphere called the stratosphere. The weight of these platforms is approximately 100 to 1,000 times less than the microsatellites currently launched into non-geosynchronous orbits. For convenient reference, the airborne communications platforms or balloons carrying a payload of electronic communications and control equipment have sometimes been referred to herein as "stratospheric nanosatellites" or "SNS" for short. In the metric system, the "nano" prefix signifies units 1,000 times smaller than the "micro" prefix. The SNS invention eliminates the need for a rocket to propel the satellite into orbit. Synchronized airborne launching of a plurality of the SNS platforms at spaced-apart geographical locations provides a low cost constellation of satellites. The SNS platforms rise after launch to a controlled, adjustable altitude where they migrate over the geographic area according to atmospheric and the stratospheric weather conditions and particularly the winds. The SNS platforms may be raised or lowered in altitude by gas venting or ballast drop in order to catch prevailing winds favorable to keep the SNS platforms evenly spaced apart. The platforms are caused to rapidly descend when no longer needed. Additional launches of additional platforms fill excessive gaps occurring in the constellation.

Existing user equipment designed for terrestrial wireless communications can work with the SNS system of the present invention. This is not the case in the traditional communications satellite industry, since either the communications satellites are very far from the user (more than 22,000 miles for geosynchronous satellites) making the signal too weak without specialized user equipment, or the satellites travel at high speeds relative to the users on the ground (more than about 36,000 mph for low earth orbit satellites) causing frequency errors in the receiver. The SNS platform is, at most, about 175 miles (280 kilometers) from the ground user, depending upon the altitude and the radial coverage range from the particular platform among the plurality of platforms covering the geographic area. Moreover, the airborne platforms move at speeds approximating the speed of an automobile (between about zero and 80 mph at their float altitude). Compatibility with existing wireless communications systems is a significant advantage because when deploying a new communications system, the user equipment investment is always the largest total investment required.

In contrast to the large deployment and new equipment costs for orbiting satellite systems, the present invention provides a low cost alternative that does not require new subscriber equipment. Thus, a benefit of the SNS System is an advanced messaging SNS network that is compatible with standard one-way and two-way pagers already in existence and already in use with tower-based transceiver networks. Even without considering deploying of the SNS system, market analysts predict 35 million users will be carrying compatible, standard two-way pager equipment by the year 2003. At, for example, $100/unit, this represents an investment by users of over $3.5 billion. These users can receive the enhanced coverage of the inventive SNS platform network as an extension of their present service simply by electing to pay the monthly and incremental usage fees. There are no up-front costs for new user equipment or training and no need to change the user's habits and burden them with carrying more than one pager or other communications device as is the case with current satellite pagers.

Furthermore, the inventive SNS system, when performing advanced messaging, uses a communications protocol or pager protocol that is being adopted internationally. International opportunities for the new system are at least equal to the U.S. potential. The SNS System may utilize other popular paging protocols as well. The system also has uses beyond personal paging for other communications, remote imaging, infrared scanning, equipment tracking and weather data collection services.

It will also be beneficial for the National Weather Service (NWS) to consider utilizing the current SNS invention as a replacement system capable of providing the NWS with required information during the ascent of SNS platforms. GPS information available from the SNS Platform could provide the desired wind information the NWS needs but is unable to afford. Existing NWS launching facilities might even be used as SNS launch, tracking and communications sites. After the ascent and transmission of weather data to the NWS, the platform would then be controlled to float at a regulated altitude and to provide other commercial communications services. The NWS sondes could be removably attached and dropped as ballast after the ascent is complete and the desired information therefrom has been transmitted to the NWS. The attached radiosondes could use exactly the same sensors utilized in the current radiosondes in order to keep the data consistant with current radiosonde data.

The inventive SNS network is uniquely designed to cover large areas and to use dedicated frequencies on a national, and ideally, on an international basis, between bordering countries. It is beneficial to allocate nationwide, or ideally international dedicated frequencies to the SNS system due to the large coverage circles of each of the SNS airborne platforms. Overlapping use of the same frequency without time multiplexing the signals would most likely cause interference at the receiver. The System will optimally work within a range of frequencies designated the "Narrowband Personal Communications Services" or "NPCS" spectrum. Moreover, the NPCS industry in the U.S. has generally agreed on a standard two-way messaging protocol called "ReFLEX" (ReFLEX is a trademark of Motorola, Inc.). ReFLEX is a protocol that uses a Time Division Multiple Access (TDMA) system. The ReFLEX protocol is an extension of the FLEX protocol designed by Motorola and is a synchronous protocol where there are 128 frames in a four-minute cycle. The start of each frame is coordinated nationwide using GPS technology for timing. This will allow a single frequency to be shared between the SNS network of the present invention and existing terrestrial satellite networks by simply allocating a certain number of frames to each network during each four-minute cycle. Thus, the disclosed SNS system can either operate on its own dedicated frequencies or interoperate with terrestrial systems on the same channel and never transmit on top of each other. This is unique to TDMA and is preferably incorporated into the new SNS system.

While the TDMA system is used by the preferred FLEX and ReFLEX protocols, the SNS invention may also work using other systems such as Code Division Multiple Access (CDMA) and even Frequency Division Multiple Access (FDMA) systems. Code Division Multiple Access (CDMA) spreads the digitized data over an entire available bandwidth. Multiple data streams are laid over each other on the channel (sometimes referred to as spread spectrum technique), with each datastream assigned a unique sequence code. While the unique sequence code can provide a very efficient use of bandwidth, it nevertheless is highly complex and expensive. The FDMA system assigns each datastream its own frequency. Although this provides a system that is fairly easy to implement and has a low cost from an equipment standpoint, it nevertheless results in a highly inefficient use of bandwidth.

ReFLEX has 128 discreet time slots or frames in a four minute period. The SNS system may use its own frequencies or it may share the time slots with a partnering paging carrier. The TDMA system used by ReFLEX provides efficient use of bandwidth. It has some complexity and associated equipment cost. However, the complexity continues to be more easily handled with high speed microprocessors and the equipment cost continues to be reduced.

On one frequency, the 128 time slots or frames that the ReFLEX protocol breaks each four minute cycle into, can be shared by the SNS system with other paging antennas and terrestrial towers that may have overlapping geographic coverage. A single pager may be able to receive the broadcast from multiple platforms and terrestrial towers, but because each platform or tower with adjoining coverage is allotted a specific frame or specific frames, the pager "hears" only one transmitter in each time slot. It is an object of the present invention to provide a construction of communications platforms that may be dynamically assigned new frames in which to transmit as the platforms drift in order to make sure that a pager receives transmissions from only one transmitter in the same frame.

Also it is an object of the present invention that the time slots may be dynamically reassigned so that at any given time or location one platform may have a greater number of available time slots than another in order to provide more capacity to platforms that may need higher capacity. Dynamic frame allocation (or dynamic capacity allocation), is a complex task. At any time that more frames are allotted to one platform, all other platforms that have overlapping coverage with that one platform lose access to the frames that are assigned and therefore lose capacity. Nevertheless, the ability to have dynamic frame allocation will facilitate maximizing capacity of the entire system by efficiently using all available time slots to their greatest capacity while minimizing allocation of time slots or frames in geographic areas with low communications capacity requirements.

Also although the ReFLEX two-way paging protocol using TDMA as described above is preferred, it is also an object of the present invention that the SNS may also be compatible with other pager protocols. For example, three other primary pager protocols include FLEX, POCSAG, and ERMES. The FLEX protocol is the one-way paging system that is the predecessor of ReFLEX. POCSAG is an older paging standard for one-way communications and is less efficient. Nevertheless, most pagers in the U.S. are still POCSAG compatible even though FLEX has higher noise immunity, a higher throughput and is becoming the standard in the U.S. and abroad (except Europe) for one-way paging. The ERMES paging protocol is the one-way paging European standard (currently governmentally enforced). The SNS system could also be appropriately configured in its circuitry to handle communications according to the ERMES protocol and therefore is adaptable to European usage as well.

In contrast to most voice and paging networks where many different protocols are used over a wide range of frequencies, NPCS contains a near contiguous set of nationwide frequencies in which nationwide narrowband PCS licensees have adopted the FLEX/ReFLEX protocol.

The present inventive SNS system benefits from a nationwide consistency of frequencies and protocols so that it can relatively easily operate across all NPCS channels owned by any or all of the nationwide carriers if need be. Minimal governmental regulation of the NPCS bands also allow the new SNS system, which was unknown when the NPCS regulations were drafted, to operate in the NPCS bands without violating current regulations. Since the NPCS licensees essentially own the frequencies purchased at auction, and the inventive SNS system can compatibly use the same frequencies with permission from the purchaser, additional licenses from the FCC may not be needed. This unique feature also saves two or three years in start-up time that it can sometimes take in order to pursue separate licenses.

As discussed briefly above, in addition to minimizing the regulatory hurdles, the new SNS network has a huge advantage in that it does not require new, specialized user equipment. It is expected that there may be as many as between 6–15 million units of compatible user equipment operating off existing terrestrial networks. These can simply be added to the new SNS system using inexpensive system programming and thereby receive the expanded, more complete, coverage of the contiguous geographic area provided by the constellation of floating communications platforms according to the present invention. To the NPCS carrier, the new system can provide complete communication coverage, particularly coverage in remote non-metropolitan areas.

Since existing paging equipment owners and users may acquire the expanded coverage provided by the present invention through their existing carrier, the decision to expand coverage can be as simple as checking a box on their monthly bill. They could keep their current paging company, and simply add the benefit of remote area coverage provided by the SNS. No new equipment is needed and no start-up time is needed to learn the features of a new electronic device. There is simply improved coverage for the user without changing equipment.

A very important benefit of the inventive SNS network is the significant improvement in complete remote area geographic coverage. Currently, wireless data coverage is a patchwork of covered high density population areas, primarily around metropolitan areas. The SNS network works cooperatively with the existing coverage areas and fills in all the low density population and thus low communication traffic areas all using the same subscriber device. The governmental regulations governing NPCS systems require minimum system build-outs for all licensees. For example, by about 1999, a nationwide licensee providing NPCS must service at least 37.5% of the U.S. population or 750,000 square kilometers, and by the year 2004, a NPCS licensee must service at least 75% of the U.S. population, or 1,500,000 square kilometers. Since the population is very concentrated, prior systems have been required to build towers for coverage over a very small percentage of the total landmass. In fact, the minimum area requirement for the 1999 and for the 2004 population service requirements correspond to approximately 8% and 16% of the total U.S. landmass, respectively, because of the high population density in U.S. cities. For example, covering 90% of the population requires a carrier to build out only about 20% of the country's total landmass. Servicing areas of low population density is more expensive for prior systems since tower transmitter/transceivers have a short range requiring much more equipment per potential customer. Thus, few prior carriers have systems that cover more than 90% of the population because of the diminishing returns. Many established wireless data carriers are built out only to about 70%–80%.

The present invention is designed to provide substantially 100% coverage and can be compatibly combined with existing wireless carrier systems and networks such that the high density build-out by prior paging system carriers handles the high population density geographic areas and the low population density or remote areas, wherever they might be located within the contiguous geographic area, are handled by the inventive SNS system. The SNS system is complementary to high density tower paging systems. Thus, although the SNS system has a lower total signal handling capacity when compared to high population density tower systems, it provides complete geographic coverage so that subscribers in or traveling through remote areas are provided with the additional coverage of the SNS system. Subscribers are always within the range of paging services or other compatible communications services using a single device. The SNS system may also reallocate capacity on a regional basis by launching more SNS platforms or by reallocating the frequency use dynamically among the neighboring platforms.

The SNS system also has uses beyond personal paging for other communications including voice, remote imaging, infrared scanning, equipment tracking and weather data collection services. Broadband PCS (BPCS) phones that have come to market in the past year all offer an advanced messaging service call Short Messaging Service (SMS). The SNS system could page a subscriber's phone when the phone was out of the BPCS phone service area. BPCS voice service may also be possible with an SNS system. Another potential application for SNS technology is the remote imaging market. Governments, city planners, farmers, environmentalists, mapmakers, and real estate developers all rely on aerial or satellite photos. Worldwide, this market is over $1.4 billion. Since an SNS is over twenty times closer to the subject than a satellite, SNS can achieve one-meter resolution with only a 0.75-inch diameter lens. Weather data from the extended stay in the stratosphere can be collected and reported by the SNS platform as current radiosondes do not have the capability of maintaining a float altitude.

SUMMARY OF THE INVENTION

The preferred embodiment of the present invention is a constellation of small airborne communications platforms with a ground network of launching, tracking and communications terminals. Although the entire system is described primarily in terms of communications that are in the form of a paging system, other communications such as voice communications, emergency road service, search and rescue, emergency medical, remote imaging, environmental monitoring, industrial & utility monitoring, remote asset management, photo data, IR scanning, equipment tracking, boxcar and container tracking, vehicle security, personal security, hazardous materials, customs and international shipping security, child security, wildlife tracking, personal messaging, communications for the handicapped, SCADA, trucking communications and shipment tracking, and many other adapted communications might be easily included. As it is used here, paging includes traditional one-way paging as well as newer advanced messaging services (such as two-way paging and voice messaging). The airborne constellation of communications platforms and ground support system extends the limited coverage of current paging networks to provide complete communications coverage over an entire contiguous geographic area. For example, in the U.S., it provides true, nationwide coverage. The ground based tower systems already in place provide the in-building coverage needed in the urban areas while the SNS System provides coverage of the low population density, rural areas. Thus a subscriber can have complete nationwide coverage using the same handheld paging device. The inventive system does this by providing a constellation of evenly-spaced, high altitude, airborne communications platforms, for example, balloon-carried paging transceivers, as opposed to the traditional systems of ground-based communications towers covering only a limited area or, as opposed to very expensive orbiting, high or low altitude, satellite communications systems.

To form the constellation of airborne communications platforms, paging transceivers are attached to lighter-than-air carriers, such as high altitude balloons similar to those used by the National Weather Service (NWS) yet modified to provide for regulated adjustable altitude control using methods such as gas venting and ballast dropping. The lighter-than-air carrier or balloon and the attached communications devices have been referred to in this application as stratospheric nanosatellite platforms (SNS platforms). For coverage of a contiguous geographic area consisting of the continental United States, SNS platforms may be launched periodically at regular intervals or as needed from approximately 50 to 100 sites throughout the United States. These launch sites may be selected for launching the balloon-carried transceiver to rise to a regulated floating stratospheric altitude of approximately 60,000 to 140,000 feet. Computer regulated altitude control and computerized tracking are utilized. The SNS platforms are regulated to maintain a desired altitude within a predetermined altitude range, as, for example, in the stratosphere over the Earth, as they drift along with existing wind currents. New SNS platforms may be launched to fill any gaps that may occur in the coverage as the platforms drift at different speeds, as they loose buoyancy or as they occasionally burst or malfunction. New SNS platforms may also be launched to provide additional communications capacity as the need arises. Newly launched SNS platforms can collect, record and transmit meteorological data during the ascent to the regulated altitude. Such data might be beneficially communicated via radio to the ground for use by the National Weather Service (NWS). The process of modeling and thereby predicting the coverage of the network of SNS platforms on a continuous basis is a complex task due to the constantly changing weather conditions. This task is facilitated by also using the weather data recorded and/or transmitted to the ground for predicting the movement of individual platforms relative to each other and relative to ground launching and tracking terminals. This data may also be used to control the altitude of individual SNS platforms to catch favorable prevailing winds to help fill gaps in coverage. Each floating satellite at a stratospheric altitude will have line-of-sight radio communication coverage at a radius of approximately 175 miles (280 km) in all directions from antenna suspended below and forming a part of the communications platform.

Ground-based support for the plurality of SNS platforms forming the constellation consists of at least one network operations center (NOC) and a plurality of launching and tracking terminals. The NOC is preferably a high speed, high volume, computing, communications and operations center for the SNS system. The NOC may be in charge of all controllable aspects of every communications SNS platform's flight and operation. These controls include platform launches, floating altitudes, tracking, all paging communications and control signal transmissions, and communications with partnering paging companies. Typically, the SNS ground terminals include launch facilities, tracking and communications equipment and communication antennas. The co-located launch facilities and ground terminals may also advantageously correspond with existing locations of the approximately seventy NWS balloon launch facilities that are designed to monitor weather conditions nationwide. Similar Weather stations also exist and are maintained by treaties essentially world wide. These ground terminals may be automated. Portable or mobile launching and tracking ground terminals can also be used when necessary to fill in anticipated coverage gaps that may develop between the overlapping circular coverage patterns of the floating platforms. These portable or mobile launching and tracking ground terminals may be moved seasonally to provide additional launch sites as the stratospheric winds change on a seasonal basis. These would most likely be positioned along the coastline or the edges of the coverage area. The ground terminals can advantageously track a number of SNS platforms floating near their location and can provide the uplink and downlink of all communications, including paging and control data, to each platform within range of the terminal. Paging signals from a subscribing paging company may be sent to the SNS system through the NOC. The NOC determines which SNS platform is currently over the addressed pager and sends the paging message to the ground terminal that is tracking that SNS platform. The ground terminal receives the paging message from the NOC and relays it to the SNS platform. The SNS platform then transmits the paging message down to the individual pager. Any message sent by a two-way pager is received by the nearest SNS platform and relayed down to the ground terminal. The ground terminal sends the message to the NOC, which relays the message to the appropriate subscribing paging carrier. The NOC also keeps track of all billing information and subscriber location information. The SNS system is advantageously designed to be fully compatible with FLEX (one-way pagers) and also ReFLEX (two-way pagers) without modification to the pagers. The launch facilities, whether co-located with NWS launch facilities or separately located at other selected ground locations, may consist of a fully automated launcher and ground terminal. One ground terminal may control multiple SNS platforms at one time. Land lines, satellite links, platform-to-platform, balloon-to-balloon, or other network communications coupling from one ground location to another may be used to connect the plurality of launch sites and ground terminals to each other or the NOC.

BRIEF DESCRIPTION OF THE DRAWINGS

These and other objects and advantages of the invention will be more fully understood with reference to the following specifications, claims and figures in which like numerals represent like elements and in which:

DETAILED DESCRIPTION OF THE INVENTION

Figure 1:
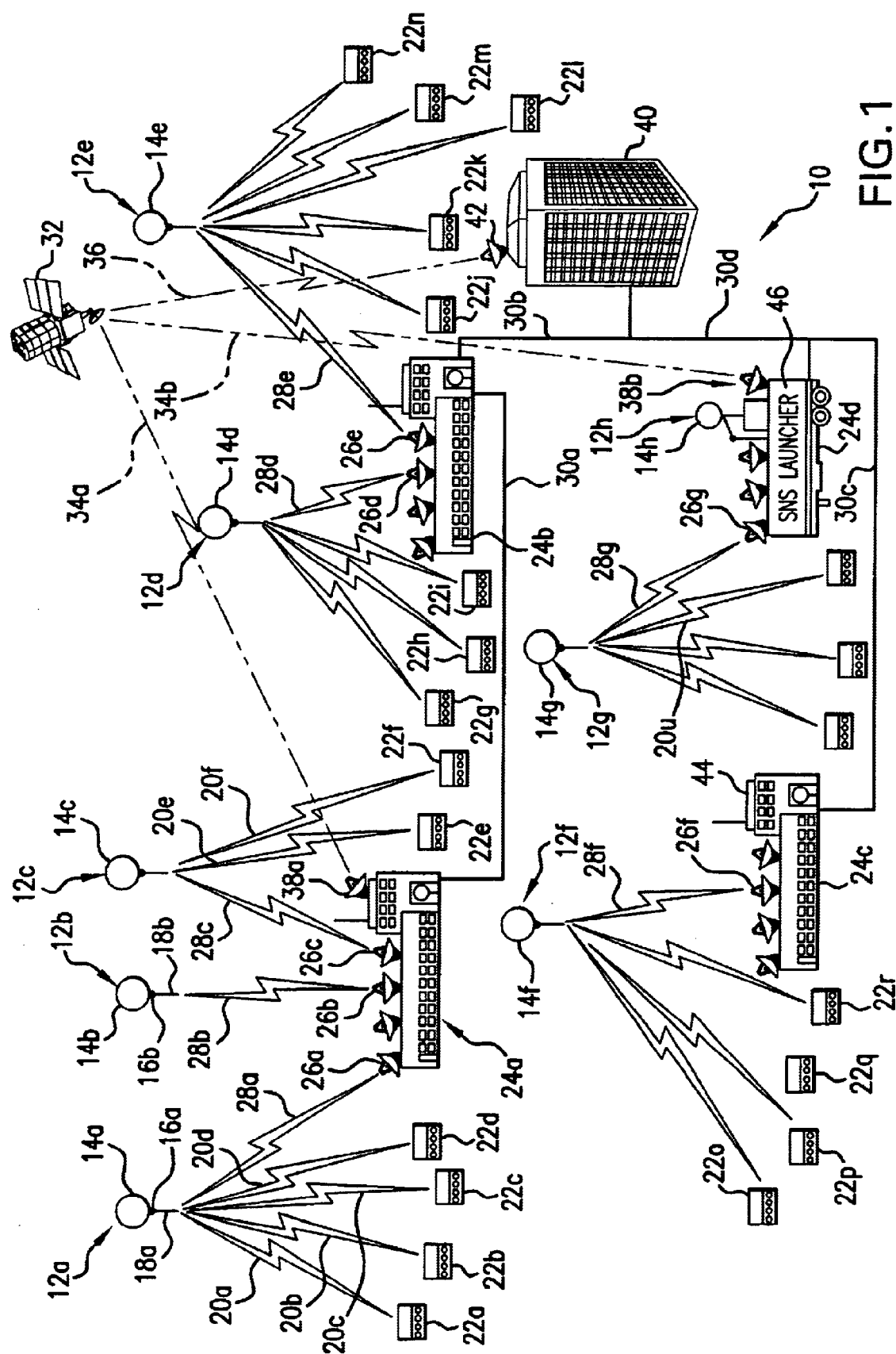
FIG. 1 is a schematic depiction of a plurality of airborne platforms representing a constellation of platforms over a contiguous geographic area, launch facilities and communications terminals, networked together with a network operations center through ground lines and, alternatively, through orbiting satellite communications signals.

FIG. 1 depicts a schematic view of a portion of a constellation and communications network system 10 according to the present invention in which airborne platforms 12(a)–(g) have reached a desired altitude within a range of altitudes, such as in the stratosphere. Also depicted is an airborne platform 12(h) in the process of ascending to a desired altitude. Each airborne platform comprises a lighter-than-air gas enclosure 14(a)–(h), a platform control and communicator device 16(a)–(b) and an antennae 18(a)–(b). Communication signals between platforms and ground terminals are schematically represented at 20(a)–(u) correspondingly communicating with a plurality of ground communication devices such as radio signal receivers, transceivers, transmitters, or pagers 22(a)–(u). There are a plurality of launch and tracking terminals 24(a)–(d), each having a plurality of tracking antennas 26(a)–(g). Ground terminals relay message and control data between the SNS platforms and the NOC. Preferably the ground terminals can operate unattended requiring only electrical power and communications signals. The ground terminals consist of a set of transmitters and receivers and their controller, tracking antennas and a tracking controller, redundant communications links to the NOC, and backup power supply. To accommodate the potentiality for several platforms within range at any given time four to six separate transmitters, receivers and tracking antennas are currently contemplated. Glenayre offers appropriate commercially available transmitters, transmitter controllers and receivers for the SNS ground terminals although some modifications will be required. The tracking antennas 26 are schematically shown in communication with the various platforms through signals 28(a)–(g). A ground communication network 30, having interconnecting segments 30(a)–(d) are depicted communicating between the launch and tracking stations 24(a)–(d) and a network operations center 40. The network operations center 40 may also communicate with a plurality of launch and tracking terminals 24 through an orbiting satellite 32 and launch site satellite antennas 38(a)–(b) and network operation center satellite antenna 42. For purposes of illustration, launch and tracking terminal 24(c) is co-located with an airborne platform launcher 44 similar to or the same as the National Weather Service balloon launcher. One aspect of the invention also contemplates a mobile launcher and tracking terminal 46, as for example a self-contained unit mounted on a truck trailer. The mobile launcher can be transported to a desired launch site, parked there and additional SNS platforms can be launched. The tracking and communications terminals 24 can be connected to the network via ground links 30(c) and 30(d), as well as to other launch stations and to the network operations center 40. The mobile launcher and terminal may be moved periodically from one location to another location to launch and/or track additional SNS communications platforms 12 as needed to fill in coverage gaps as they might arise due to weather conditions.

Figure 2:
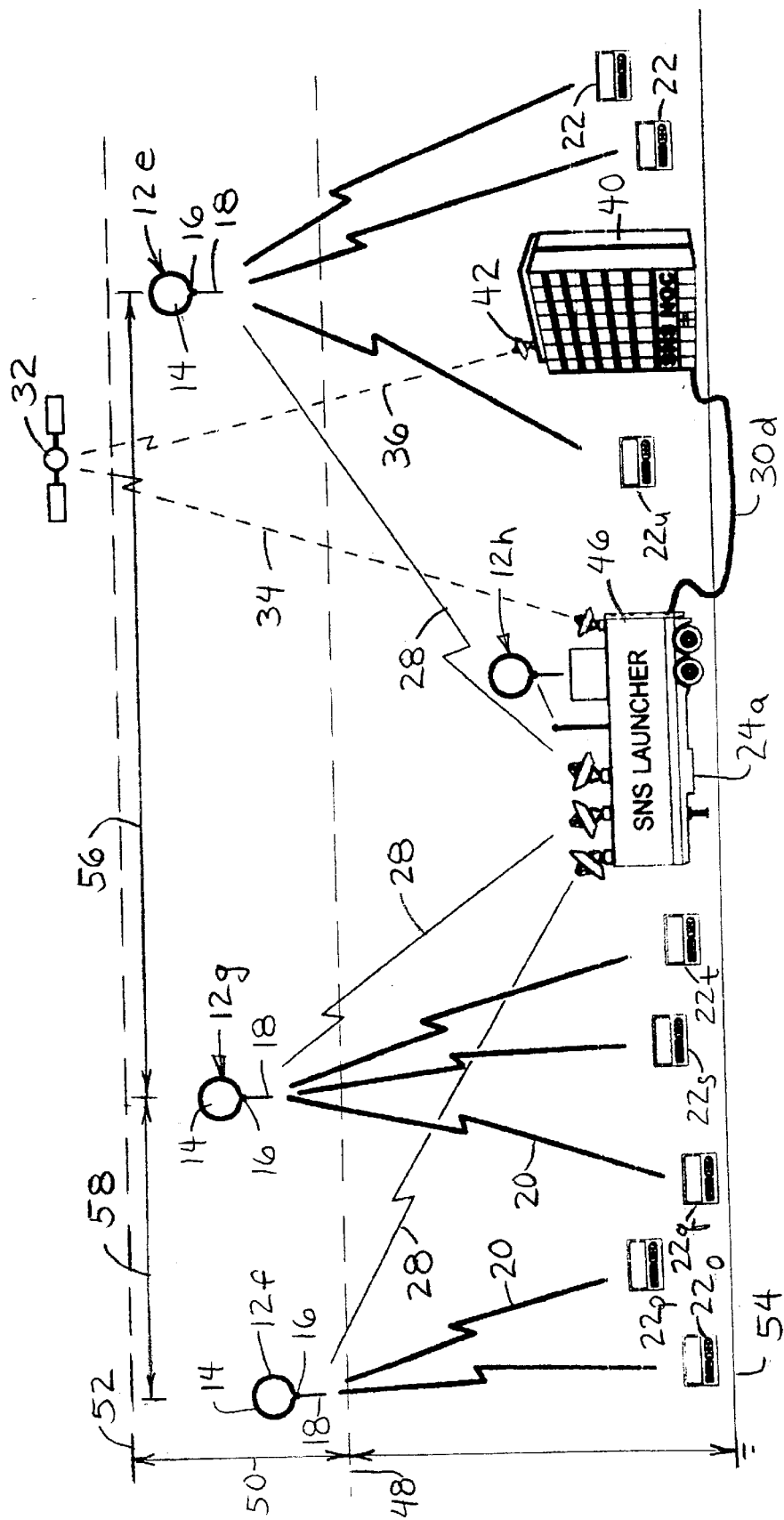
FIG. 2 is an enlarged depiction of a plurality of airborne platforms, a single moveable launch site and ground terminal with network linkage to a network operation center for a plurality of ground terminals and personal communications devices.

FIG. 2 is an enlarged schematic depiction of the mobile SNS launcher 46 of FIG. 1 shown schematically in relationship to platforms 12(f), 12(g) and 12(e) that form a portion of the constellation of platforms. The mobile SNS launcher is in communication with the network operations center 40. Further depicted in FIG. 2 is a range of desired altitudes 50 defined by a minimum desired altitude 48 and a maximum desired altitude 52, each altitude measured relative to sea level 54. In one preferred embodiment, a predetermined range of altitudes is defined by a minimum desired altitude of about 60,000 ft. and a maximum desired altitude of about 140,000 ft. These altitudes generally correspond to the Earth's stratosphere or to a range of stratospheric altitudes 50. Further depicted in FIG. 2 is a gap of coverage 56 between spaced-apart platforms 12(g) and 12(e) schematically represented as a spaced-apart distance 56 that is significantly larger than the desired spaced-apart distance 58 between platforms 12(f) and 12(g). In a further preferred embodiment, it is anticipated that platforms will be regulated to float within a predetermined altitude range of between about 70,000 ft. and 100,000 ft., will have a coverage radius measuring about 175 miles (280 km), will be above commercially regulated airspace and will be below altitudes at which platform survival is less certain. When the distance between two adjacent platforms in any direction is greater than about one and one-half times the coverage radius, a gap in coverage can begin to occur. In such instances, either an additional SNS platform can be launched from a fixed launch site or a mobile launching unit 46 can be moved on the ground to a location substantially between the two spaced-apart platforms 12(g) and 12(e) so that an additional supplemental platform 12(h) may be launched for rapid ascent to the desired altitude range 50. Computer modeling based upon the tracking of all the platforms 12 in a constellation 10 of airborne platforms can be used to predict the development of significant gaps 56 in coverage and to rapidly deploy mobile launching units to fill the gaps. In the event that a stationary launching and tracking terminal is already in a location for launching a supplemental SNS platform, no mobile unit would be required.

Figure 3:
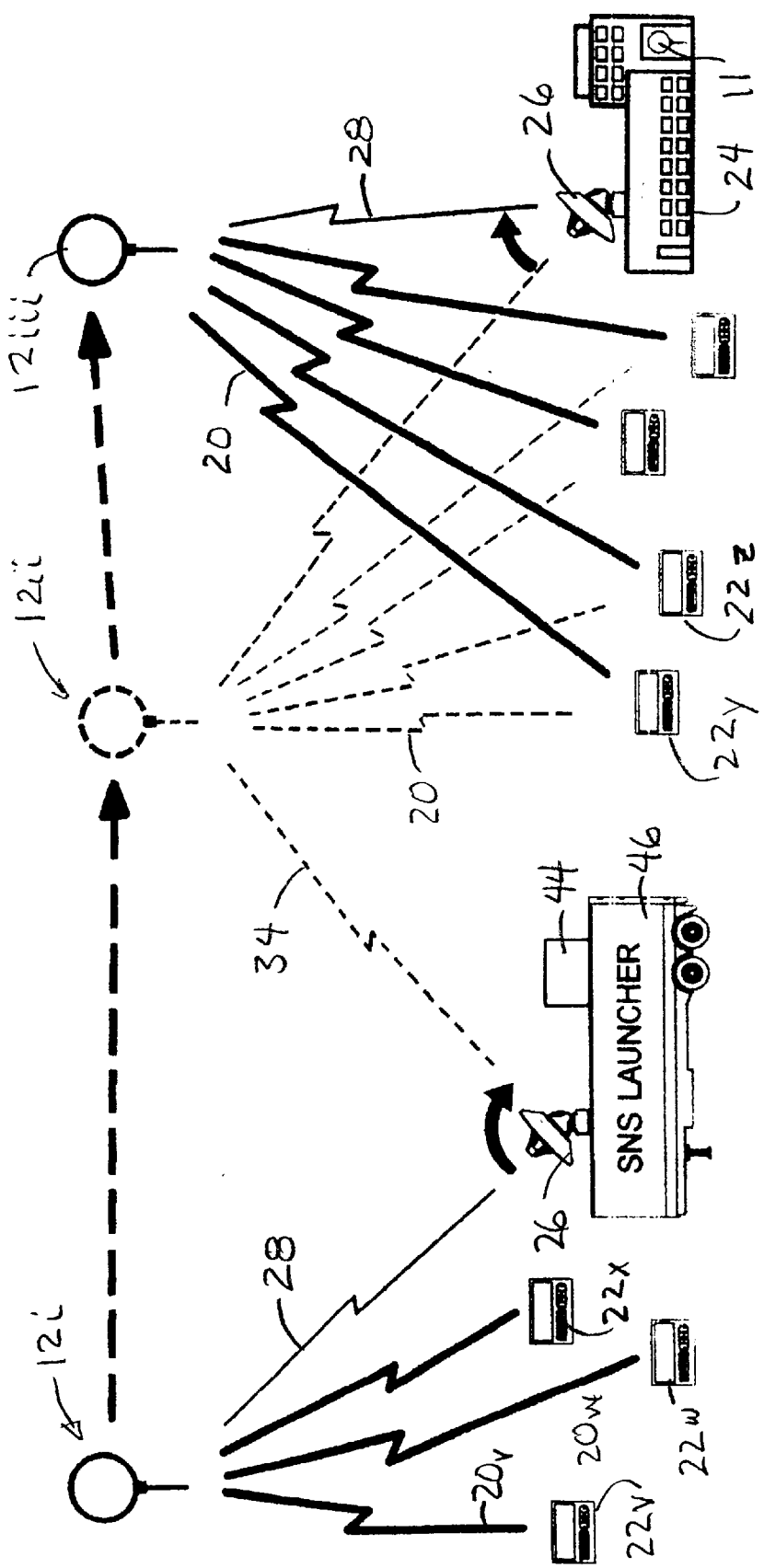
FIG. 3 is a schematic depiction of platform-to-ground terminal communications being handed off from one ground terminal to a next ground terminal.

FIG. 3 schematically depicts a platform 12(i) migrating due to wind currents to a handoff position 12(ii) shown in dashed lines. At the handoff position, the next downwind ground terminal 24(e) takes over tracking and communication and maintains control as the platform moves through position 12(iii) and over terminal 24(e).

Figure 4:
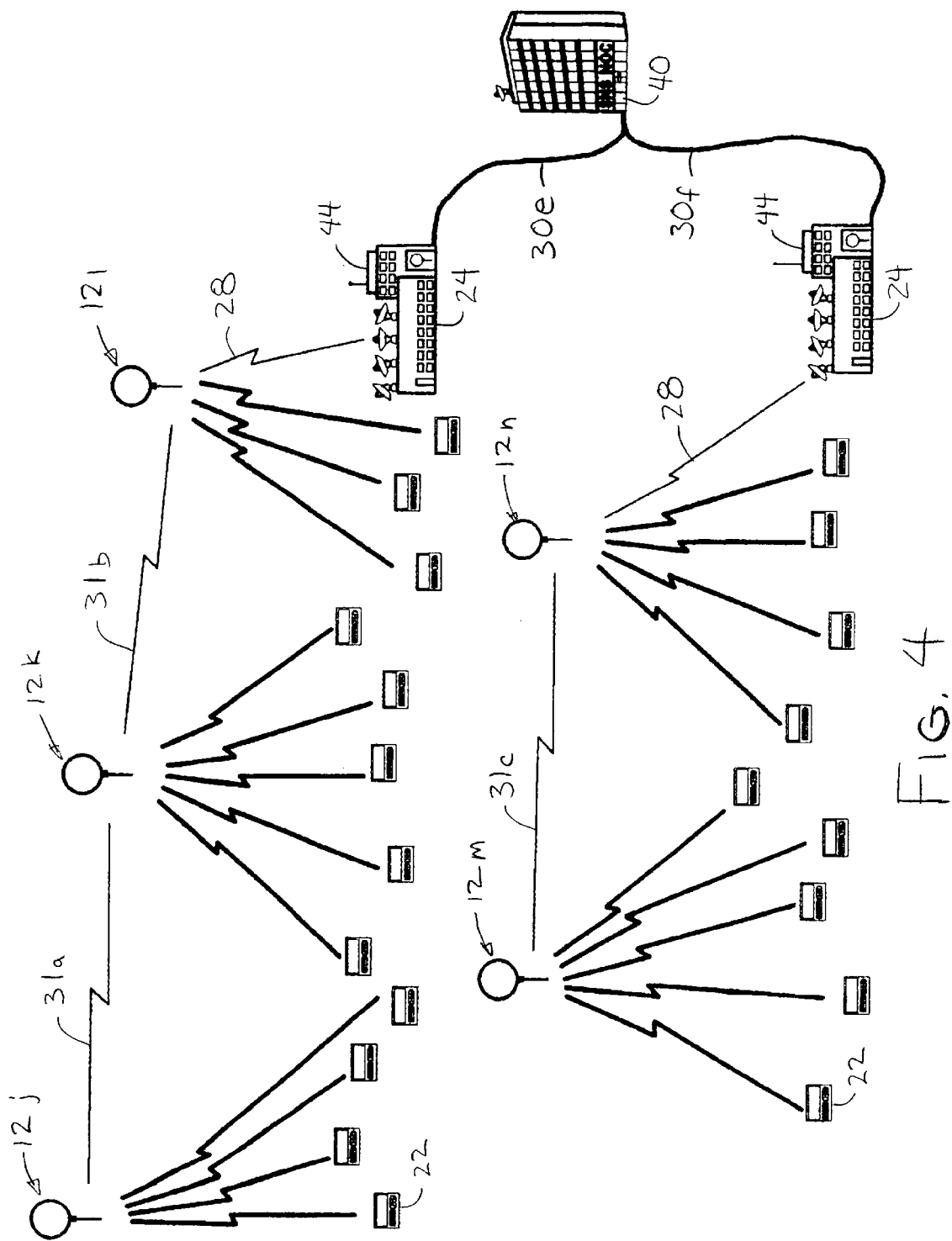
FIG. 4 is a schematic depiction of inter-platform communications with subsequent transmission to ground terminals and to a network operation center (NOC)

FIG. 4 is a schematic depiction of inter-platform communications with subsequent transmission to ground terminals and to a network operation center (NOC).

Figure 5:
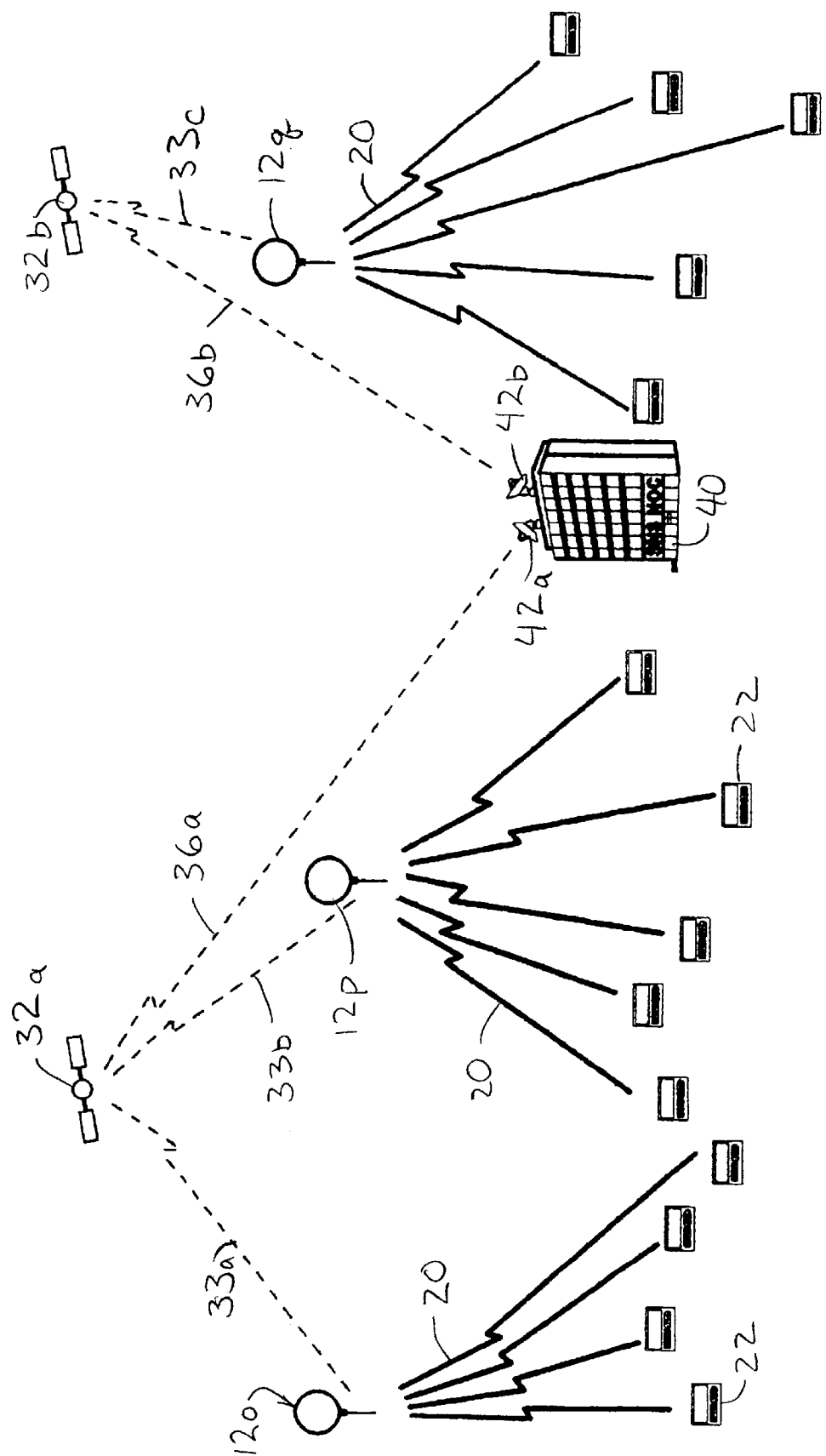
FIG. 5 is a schematic depiction of platform-to-space satellite communications links for providing the network interconnection with a network operation center (NOC)

FIG. 5 is a schematic depiction of platform-to-space satellite communications links for providing the network interconnection with a network operation center (NOC). This is advantageous because this can reduce or eliminate the number of ground terminals, as the platforms would directly communicate with the NOC through satellite links.

Figure 6:
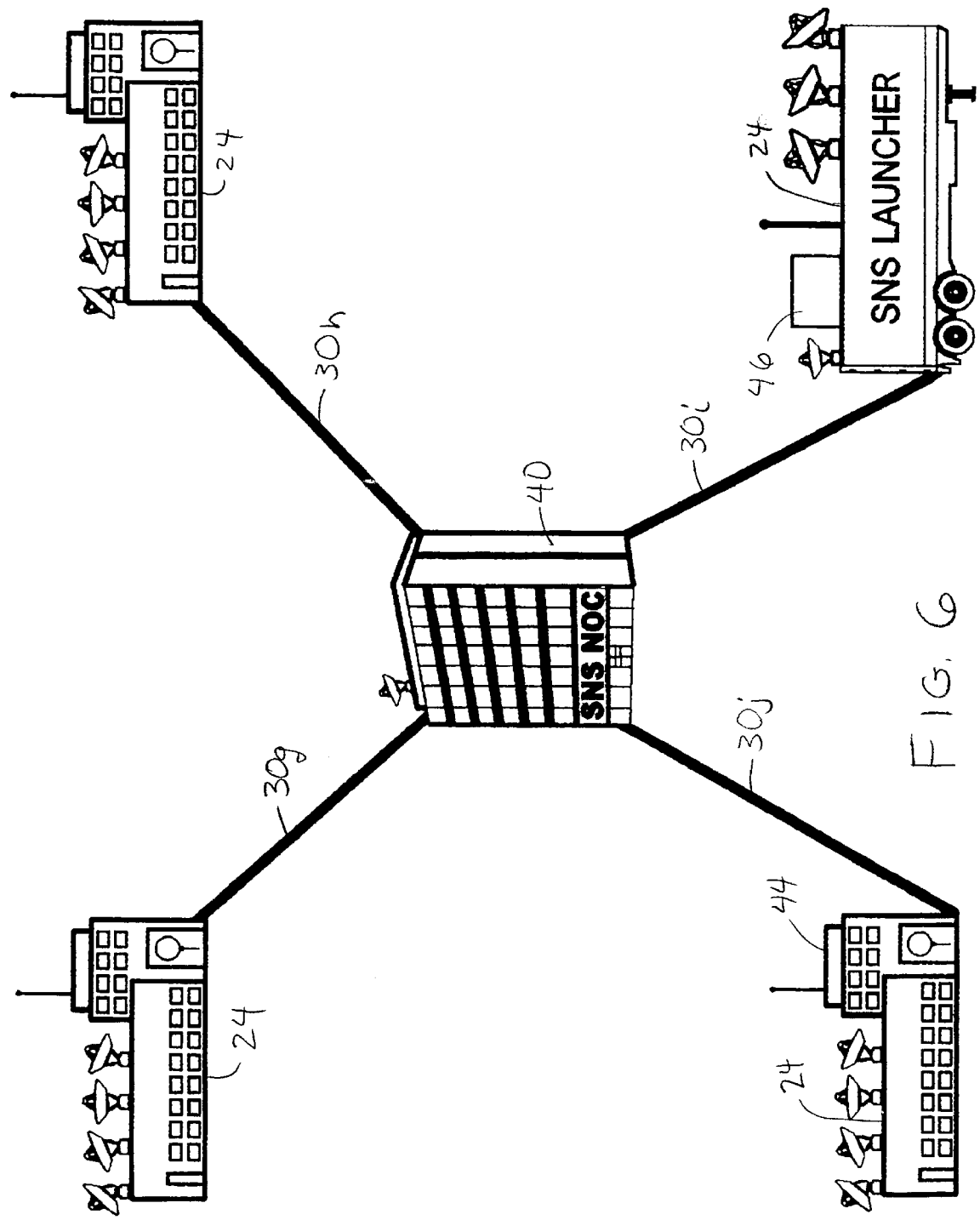
FIG. 6 is a schematic depiction of a "hub and spoke" network communication link topography.

FIG. 6 is a schematic depiction of a "hub and spoke" network communications link topology. This is advantageous because it requires fewer physical communications lines and generally requires less expensive equipment than alternative network topologies.

Figure 7:
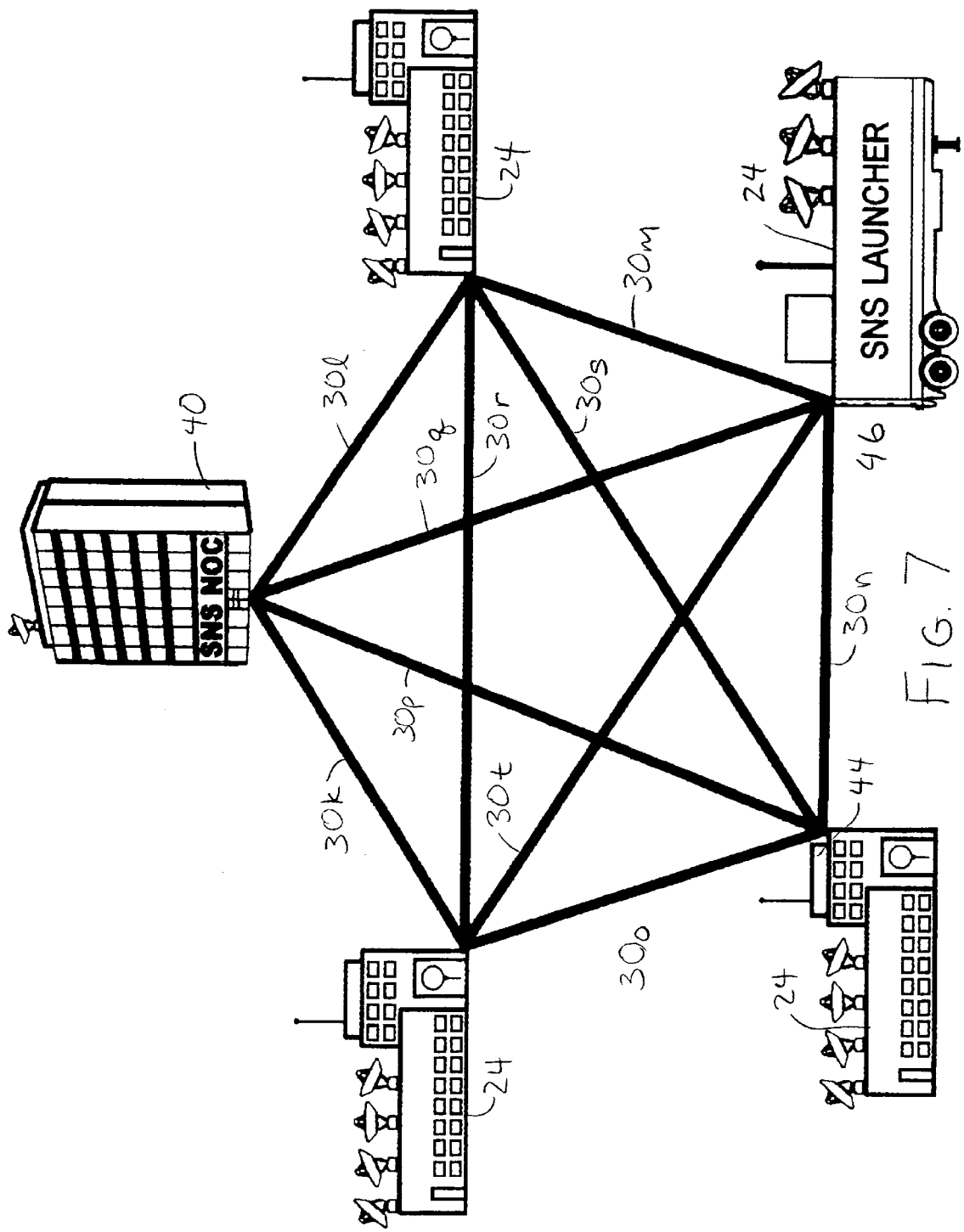
FIG. 7 is a schematic depiction of a mesh network communication link topography.

FIG. 7 is a schematic depiction of a mesh network communications link topology. This is advantageous because a "mesh" topology provides multiple redundant communications links to other parts of the network adding increased reliability.

Figure 8:
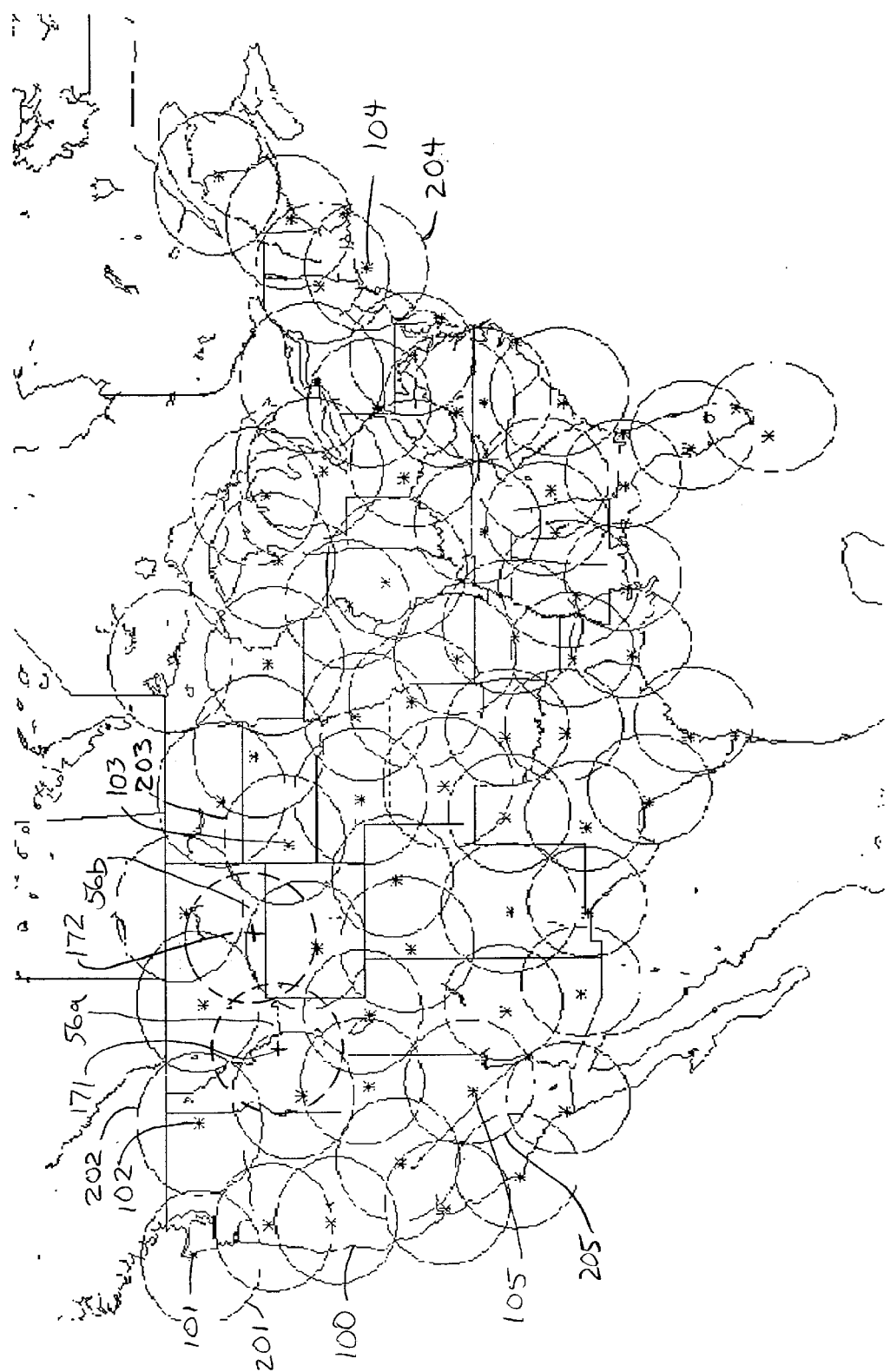
FIG. 8 is a schematic depiction of a contiguous geographic area, particularly the United States, with airborne SNS platform launch sites and showing initial coverage area SAS circles, superimposed on a map of the geographical area and demonstrating the line-of-site coverage areas for each SNS platform such that substantially the entire geographic area is encompassed within the reception range of one or more of the airborne platforms.

FIG. 8 schematically depicts a contiguous geographic area 100, and in particular by way of example, a geographic area corresponding to the United States of America. Superimposed on the geographic area 100 are 70 selected standard launch sites represented by "Xs" 101–105 (only a few examples are numbered). Further schematically depicted are coverage areas 201–205 (again only examples are numbered) representing the position and coverage of each of the platforms 101–105 as they reach a desired regulated altitude, preferably in the stratosphere. Each platform is very small compared to existing geosynchronous orbit satellites such that they have been referred to and are designed to float in a regulated altitude in the stratosphere such that they have been designated as "stratospheric nanosatellites" (SNS). The coverage areas 201–205 are depicted in FIG. 4 assuming a relatively vertical ascent from the launch sites 101–105. The coverage areas 201–205 will migrate over a period of time, due to wind and weather conditions in a particular locality. However, the ascent to the stratospheric desired altitudes normally takes from about one to two hours, such that the drift for normal airspeeds of less than about 10–20 mph and even passing through the jet stream if present will produce relatively small drifts of 10–80 miles in any direction during the ascent. Thus, relative to the approximately 175-mile (280 km), coverage radius for a circular coverage area having a diameter of about 350 miles (560 km), the migration during a short period of time with standard wind conditions of 10–40 miles, indicates that the launch site is a reasonable approximation for the initial high altitude location at the end of the ascent.

The platforms or balloons 12 are provided with altitude control mechanisms, including both low density gas venting and high density ballast dropping mechanisms, allowing the balloon to be controlled to maintain a desired altitude within a range of desired altitudes. The altitudes may be maintained for between 12–24 hours corresponding to the current NWS balloon launching schedule of two launches per day. If the NWS launching schedule is not used, the balloon altitudes may be maintained for over 100 hours depending on the lift gas, power, and ballast remaining on the balloon 12. In the case of NWS balloons, currently the balloons self-destruct from overexpansion as they reach and exceed altitudes of over 100,000 ft. and weather data is gathered and transmitted to the ground during the ascent. In the case of balloons acting as carriers for the communications platforms, the platforms will be maintained at an altitude preferably less than 140,000 ft. And more preferably less than about 100,000 ft. and will continue to migrate due to upper stratospheric wind conditions. The NOC may command SNS platforms to rapid deflate or burst in the case of a balloon 12, when the platform is no longer needed, it falls below the 60,000 ft. and no ballast remains, it drifts over an undesired area, or it malfunctions. The platform may initiate this if any of these conditions are met and the platform has lost communication with the ground terminals. Advantageously, the wind conditions will have been detected during the ascent and will continue to be monitored through the tracking by the ground stations. This will facilitate predicting the development of any gaps in coverage that might be expected, and particularly the location of such gaps and the number of ground communication devices or pagers that might need to be serviced in the area of the gap.

Figure 9:
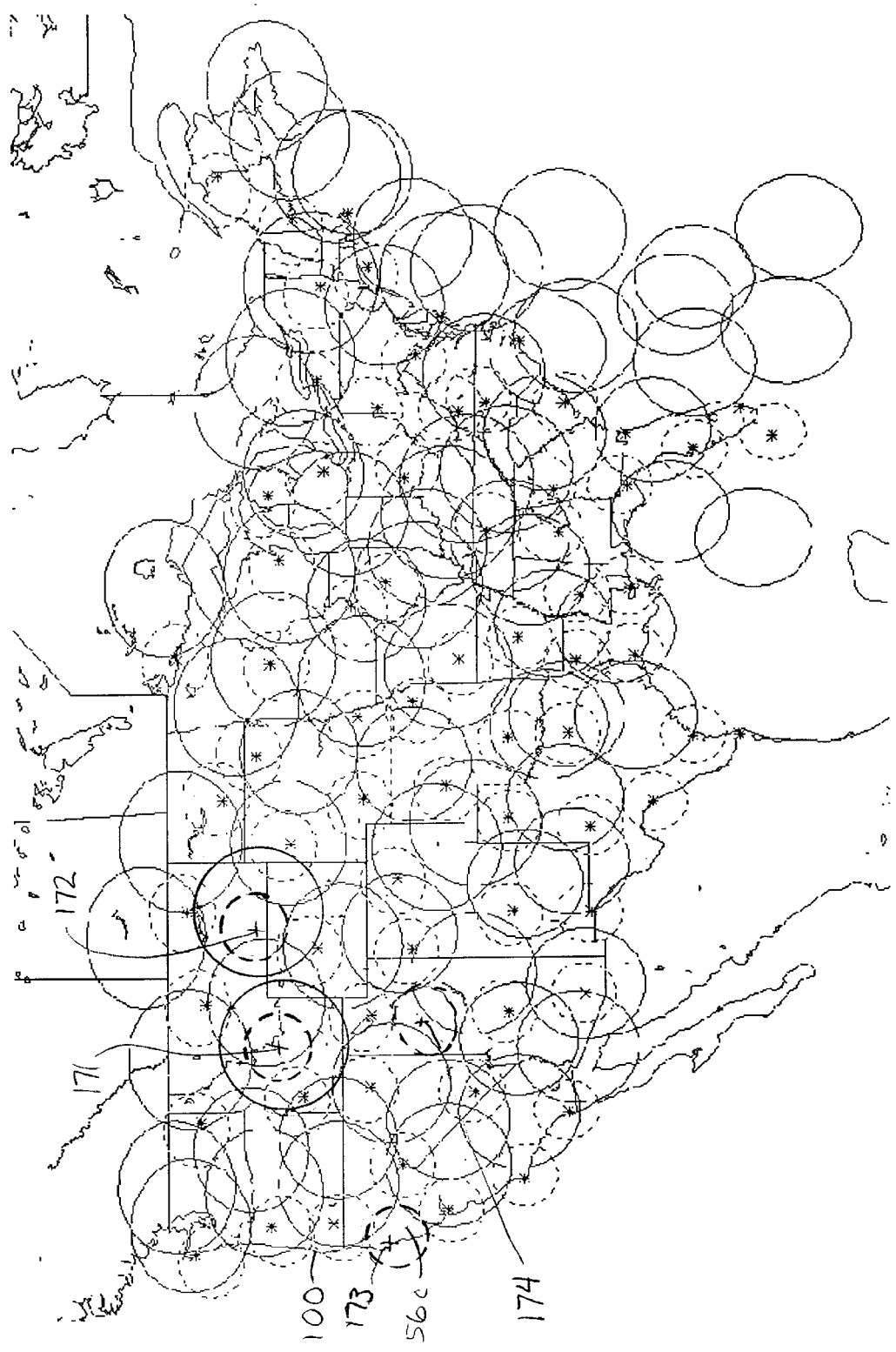
FIG. 9 is a schematic depiction of an example of airborne platform migration after a period of regulated altitude free-floating of the airborne platforms and also depicting additional gap-filling launch sites, that may be provided by mobile launchers, to supplement and complete the continuity of coverage with additionally launched airborne communications platforms.

FIG. 9 is a schematic depiction of the geographic area 100 after a given migration time period during which significant gaps may begin to occur. Mobile units may be positioned at temporary launch sites 171 and 172 for filling developing gaps 56(b) and 56(c). Also, where a gap is predicted to develop in close proximity to a standard launch site, as, for example, at 105, an additional platform may be launched from launch site 105 in advance of the normally regular launch time period. Thus, gap 56(c) may be filled by an additional launch. In a similar manner, regionally located mobile launch sites may be employed to fill gaps as they arise. In the event that a pattern of gap development is detected, then additional permanent launch sites 173 and 174 may be added to help compensate for repeated developments of gaps 56(d) and 56(e), for example. Temporary launch sites may be moved seasonally to fill the gaps along the coast line along the direction the wind is blowing for the season, for example, the western coast during the winter season.

Figure 10:
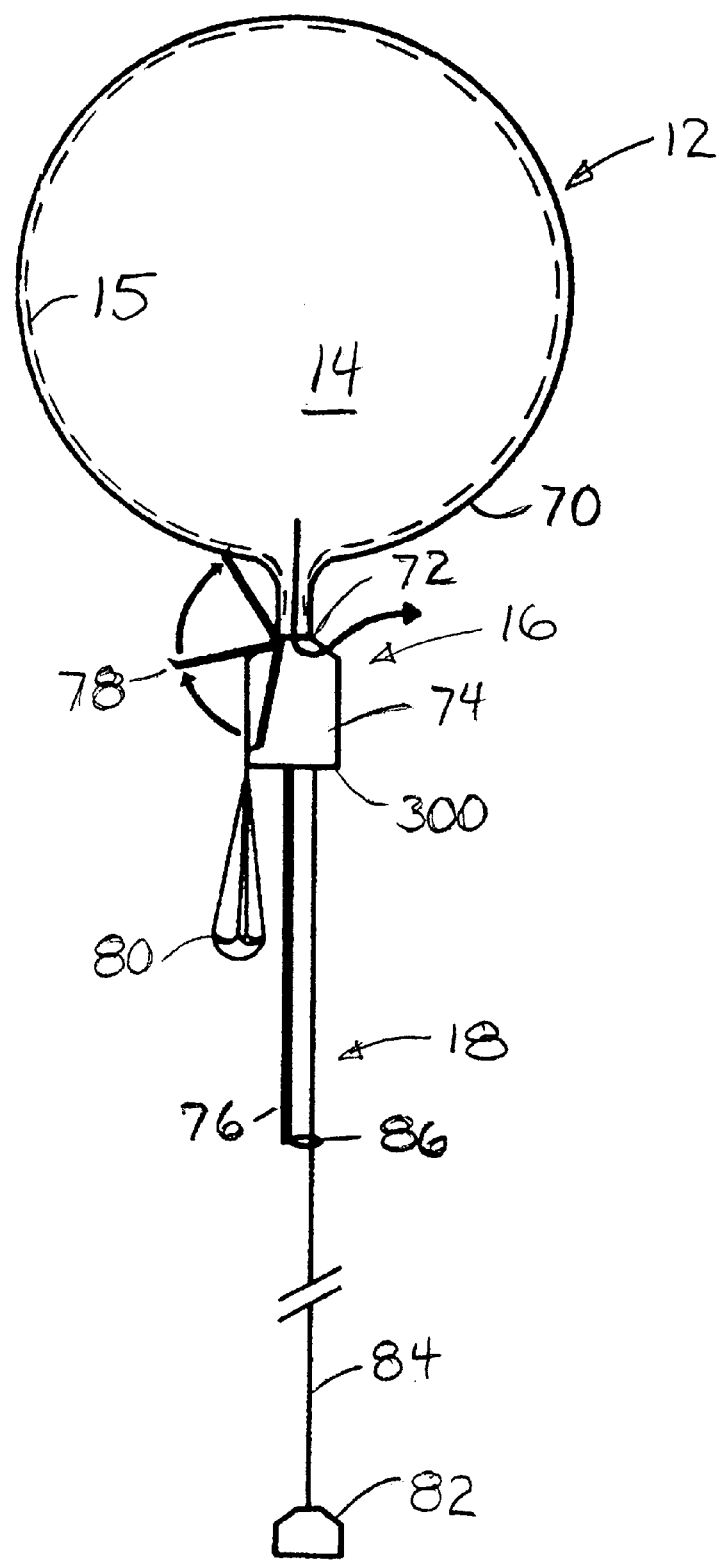
FIG. 10 is a schematic side view of an airborne platform in which a lighter-than-air gas enclosure, such as a balloon, is attached to a box holding the electronic controls, communications devices, sensors and a meteorological data gathering package.

FIG. 10 shows a schematic side elevation view of a platform 12 in an embodiment in which the low density gas enclosure 70 is preferably a latex balloon 70. A Totex 1000 balloon filled with hydrogen, helium, natural gas, or another suitable low density gas or mixture and internally coated to reduce gas diffusion adequately provides lift for the SNS communications platform. The Totex balloon is released with a diameter of about five and one quarter feet and expands to about twenty-four feet across at 140,000 feet altitude. It will be noted that other lighter-than-air enclosures, such as blimps, aerostats, zeppelins, airships, dirigibles, weather balloons, jimspheres, hot air balloons, sounding balloons or meteorological balloon might also be used in place of the proposed latex weather balloon 70 schematically depicted in FIG. 10. Also, the diameter of balloon 70 in FIG. 10 is not to scale and it is expected that a total platform weight, including the payload box 300, altitude control vent mechanism 72, meteorological package 82, antennae 76 and meteorological cable connection 84. Preferably the cable 84 is a fiberoptic cable having a length of approximately 25 meters so that the meteorological data collection package 82 is sufficiently distanced from the balloon 70 to reduce to a minimum the effect of turbulence caused by the balloon on the meteorological data sensed by the meteorological package 82. The fiberoptic cable 84 is used to transmit the meteorological data from meteorological package 82 to the communications unit 74. Fiberoptic cable is used as wire could arc due to the high electric field potential when passing through thunderclouds.

There are numerous types of low density gas enclosure devices, and particularly balloons, that might be considered useful for the present invention. Among the potentially preferred types of balloons are rubber pressure balloons, zero pressure balloons, internal air bladder balloons, adjustable volume balloons and super pressure balloons. Each type of these balloons has different advantages and disadvantages and, for purposes of the present invention, it has been found that the rubber pressure balloon is most preferred and the zero pressure balloon is also considered a preferred alternative. Advantageously, such balloons 14 may be coated on a surface, preferably on the inside thereof as depicted schematically at 15 in FIG. 10, with a reduced permeability material, such as by fluid deposition of a sealer that remains flexible upon application.

The rubber pressure balloons have a stretchable rubber membrane containing the lifting gas that allows the balloon to increase in size as the external air pressure decreases as the balloon rises. This is the most common type of weather balloon and is also consistent with party balloons. The primary advantage is the low cost and common accessibility so that high quality balloons of this type, such as weather balloons, are available at low cost. These balloons are somewhat fragile and they have delicate handling requirements and also low extended reliability. Further, the use of such balloons requires venting of the lifting gas to prevent bursting upon reaching maximum volumes.

The zero pressure balloons consist of an initially loose bag, usually made from a plastic such as polyethylene or Mylar. As the external air pressure decreases, the bag increases in volume. Once the bag reaches its whole volume, gas must be vented or the balloon will burst as the bag material does not stretch. Although this type of balloon may be more reliable than the rubber balloons and provide less diffusion of the lifting gas, it is of a median cost, more costly than the rubber balloons, currently between about four to ten times more expensive. Thus, although the rubber balloon might be more preferred for purposes of low cost platforms, the zero pressure balloon also provides a useful enclosure for lifting the platform up and has certain advantages over the rubber pressure balloons.

Internal air bladder balloons consist of a flexible balloon containing air enclosed in a fixed volume balloon containing a lifting gas. Air is pumped into the inner-flexible balloon which compresses the lifting gas trapped in the fixed volume balloon, thereby decreasing the overall lift. Air is let out of the inner-flexible balloon to increase lift. Blimps adjust lift using this principle. This type of balloon has certain advantages as there is no lift gas lost when reducing lift and it is potentially more reliable than rubber balloons, however it is more costly due to extra balloon, pump and extra required power for operating the increase and decrease of lift mechanism.

Adjustable volume balloons consist of a fixed volume containing the lifting gas and a mechanical way of reducing the volume of the balloon. By decreasing the volume, the lifting gas is compressed and the lift decreases. The volume may be reduced any number of ways, including an adjustable line inside the balloon from the neck of the balloon to the top of the balloon. When the line is shortened, volume decreases. The lifting gas is not vented to reduce lift and it may be more reliable than rubber balloons. However, it has a significantly more costly due to the mechanical volume reducing mechanism and further, requires extra power for operation of such a mechanical volume-reducing mechanism.

Super pressure balloons have a fixed volume. They are called super pressure balloons because they do not expand to match the decreasing exterior pressure. They are built strong enough to hold the increased pressure. The balloons can achieve extremely long float lives because they do not need to vent gas to prevent bursting and they typically have very low membrane gas diffusion. This type of balloon is the highest cost, although one of the most reliable, with little loss of lifting gas. The extreme high cost and difficulty of manufacture and the lack of developed technology regarding such balloons, indicates that other alternatives are currently more attractive.

A signal transmission antenna 76 extends from the communications device 74 preferably vertically downward from the communications device 74 and preferably a collinear array with approximately a 6 degree downtilt configured to provide even transmission and reception coverage over the entire circular coverage area. The antennae 77 may advantageously be provided with a support loop 86 to facilitate stabilization between the antennae and the meteorological connection cable 84. Also depicted in FIG. 10 is a balloon destruct mechanism 78 and a parachute 80 for recovery of the communications device 74, when the balloon is destroyed by the controlled destruct mechanism 78 or otherwise by natural causes.

Figure 11:
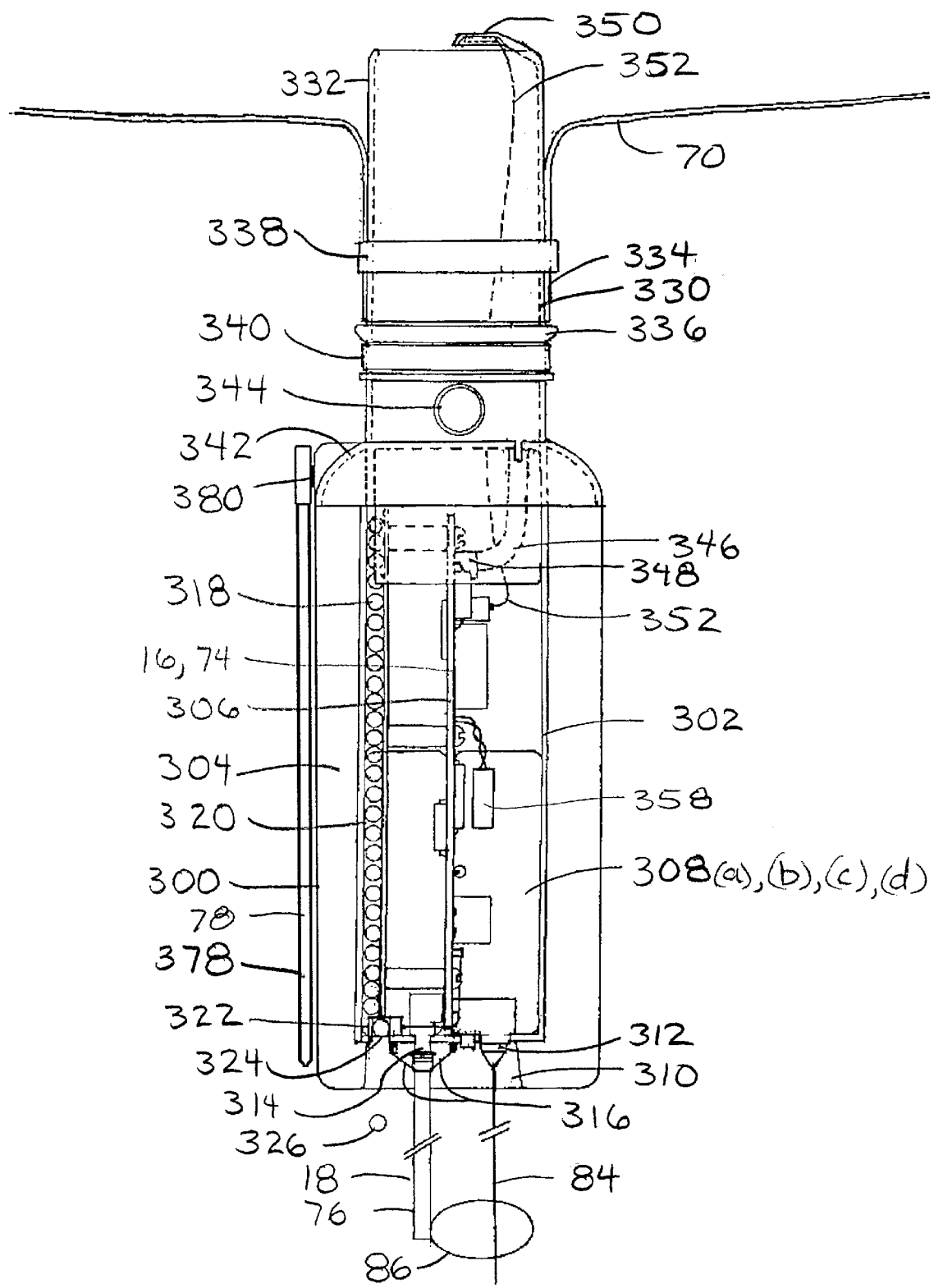
FIG. 11 is an enlarged partial cross-section of an airborne platform, including the control and communications box fastened to a lighter-than-air gas enclosure, or balloon, according to one embodiment of the present invention.

FIG. 11 depicts a partial cross-sectional front view of one embodiment of a communications device 74 according to the present invention. There is a payload box 300, including an interior container 302 and exterior Styrofoam insulation 304 surrounding the interior container 302. Within the container 302 is a circuit board 306 to which various electronic components are attached and interconnected to provide signal communication and remote control of the platform as desired. The electronics section consist of the RF section, antennas, GPS receiver, processor and power regulators. The RF section is based on the low cost transmitter and receiver section of current two-way pagers. The transmitter power is increased to approximately 7 watts. A single 900 MHZ collinear dipole array antenna serves both for transmit and receive functions. Additional antennas may be added for gateway RF links to the Ground Terminals if the additional frequencies become available. Possible frequencies include the 400 MHZ or the 1680 MHZ band assigned to meteorological instruments. If the SNS system also collects weather data for the NWS and this data is transmitted on the meteorological aids band, it may be possible to send additional gateway traffic with the meteorological data. A twelve channel GPS receiver in conjunction with the processor provides positional information to both the NWS during ascent and to the SNS NOC for the entire flight. The NOC uses the information to locate the SNS platforms, to determine coverage holes or gaps, and to make rudimentary position adjustments by varying the altitude into favorable wind speeds and directions.

Figure 12:
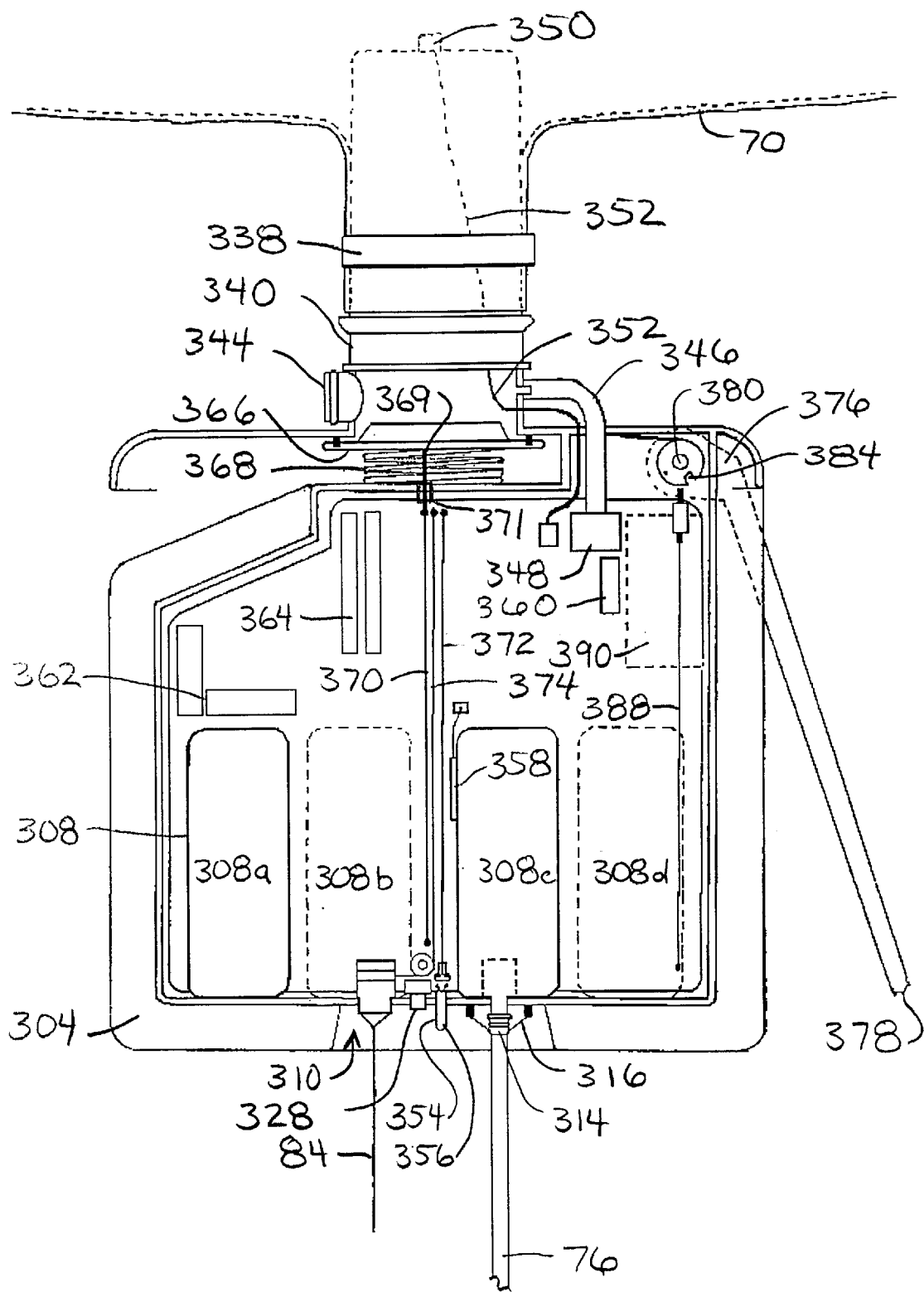
FIG. 12 is a side partial cross-sectional view of the airborne control and communications platform of FIG. 11 according to one embodiment of the invention.

The embodiment depicted in FIG. 11 and the side partial cross-section thereof as depicted in FIG. 12 shows the power for the communications device 74 being provided by a plurality of lightweight, high power batteries 308(*a*), (*b*), (*c*) and (*d*). The platform may require between about three and eighteen watts of power depending on the message traffic and the platform configuration. Lithium sulfur dioxide (LiSO2) batteries are cost and weight effective and have decent operating characteristics in a low temperature environment as found at high altitudes. The batteries are positioned at spaced-apart alternating positions so that maximum unit volume density is maintained below established maximum unit volume density requirements for federal aviation safety standards. The low unit volume density and low total payload weight keeps the launching of the balloons from being restricted by FAA regulations. For example, to facilitate keeping the platform safe as it ascends, A floating constellation communications system as in claim 1 wherein said each of the platforms will preferably be an unmanned free balloon and the payload box and its contents will preferably have a total weight of six pounds or less. The exterior surfaces will have predetermined areas and the weight to size ratio will desirably be maintained at no more than three ounces per square inch on any surface of the payload box and on the meteorological package where one is attached to the platform. The weight to size ratio is determined by dividing the total weight in ounces of any payload or package attached to the free balloon by the area in square inches of its smallest exterior surface of such payload or package.

In the platform payload box 300 there is a bottom opening 310 through which the meteorological connection cable 84 connects at a releasable cable connector 312 to the circuit board 306 inside of the container 302. Also, antennae 76 is attached at an antennae connection 314 located in the bottom opening 310 so that signals may be received or transmitted through the antennae 76 to and from circuit board 306. Meteorological data from fiberoptic cable 84 may be received and processed in components of the circuit board 306 and transmitted to the ground terminal 24 through antennae 76. To facilitate ease of detachment of the meteorological package upon inadvertent impact, the fiber optic cable will desirably separate from the balloon upon an impact of fifty pounds or less. Active antennae stabilizers 316 are provided to reduce and dampen movement of antennae 76 so that consistent signal reception and transmission is accomplished. To facilitate regulation of the altitude of the airborne platform 12 and the attached communications unit 74, the payload box 300 includes a ballast storage chamber 320 in which ballast 318 is carried. Ballast 318 is preferably easily moveable lead shot, metal BBs or spherical glass beads that may be controllably released as with a ballast drop gate, such as a shuttle, that moves alternatively between opening into the ballast chamber 320 and then to the ballast outlet orifice 324, such that the ballast may fall from the bottom opening 310 as schematically depicted at 326. For convenience and for avoiding power depletion during storage or transport, a manual circuit activation switch 328 is provided.

At the top of the payload box 300 is a balloon connection spindle 330, having a distal neck top 332 over which the flexible balloon connection neck 334 is attached. The balloon connection neck is sized for fitting over the spindle and is stretched and moved down to a stop lip 336 so that it is secured in position with one or more heavy rubber bands 338. For convenience, a rubber band storage channel 340 is provided below the stop lip. A rubber band is stored and in position for securing a "fresh," lighter-than-air enclosure or balloon 70. Preferably, balloon 70 will be filled with helium (He), hydrogen ($H_2$) or natural gas through a light gas fill valve 344 that is preferably positioned above a rain hood 342 that shields the payload box and certain components thereof from rain and other precipitation. The light gas fill valve 344 provides for a convenient connection to a light gas supply tank, such as a helium or a hydrogen supply tank, so that an expandable balloon is attached at its neck 334 to the spindle 330 and fill gas can then be supplied in a desired amount into the attached enclosure or balloon. A gas pressure sensor tube 346 communicates between the interior of the spindle to relay the internal balloon gas pressure sensor 348 connected to the electronics of the circuit board. A gas temperature sensor 350 is attached and is desirably positioned at or above the neck top 332. A temperature sensor wire 352 communicates a signal representing the temperature to appropriate circuitry on the circuit board 306. An ambient air temperature sensor 354 is also desirably provided, as well as an ambient air pressure sensor 356, both of which are connected for communicating the sensed ambient air temperature and the sensed ambient air pressure to the circuit board. A battery temperature sensor 358, a payload temperature sensor 360 and an attitude sensor 362 may all be connected to the circuit board 306 to desirably provide information and input for remote controlling and for maintaining the functions of the airborne platform 12 using the circuit 306. The data collected from the gas temperature sensor 350, the ambient air temperature sensor 354, the gas pressure sensor tube input 348, and the ambient air pressure sensor 356 is used, in part, to determine if the balloon is nearing a burst condition. A heater and cooler device 364 is attached to control the interior temperature of the payload box. As the airborne platform ascends into high altitudes, the ambient temperature drops dramatically and the interior of the box will desirably be heated by heat generated by the batteries or, alternatively, by the heater 364. If the heat from the batteries is significant and is combined with, for example, bright sunlight, the interior temperature might increase above desired operating temperatures, then the cooler portion of heater and cooler device 364 may be activated to maintain a desired operating temperature range. The heater and cooler device may be a thermoelectric cell.

For purposes of regulating the altitude of the balloon and, in particular, to avoid continuous ascent above the desired maximum high altitude, a light gas relief valve 366 is provided. A spring 368 keeps the relief valve 366 normally closed. An actuator rod 369 is attached to the valve 366 and to a valve actuator wire 370, to open the valve against the spring loading. A Nickel-Titanium (NiTi) wire may be used as the actuator wire 370. Light gas relief valve 366 opens against the spring loading when a small amount of current is passed through the NiTi wire causing it to shrink or shorten a predetermined amount so that the relief valve is pulled open, thereby allowing lighter-than-air gasses to escape. The actuator rod may pass through the top of the container 302, preferably through a seal 371, so that the interior of the container is not directly exposed to the elements. The ballast shuttle gate 322 may similarly be activated with a ballast drop actuator wire 372, also made of Nickel-Titanium (NiTi). The active antenna stabilizers 316 may similarly be comprised of NiTi wire.

A meteorological drop control wire 374 may also be NiTi and can be used to disconnect the weather sonde after meteorological data is no longer being obtained. Typically, weather balloons burst after they pass approximately 100,000 feet. Here, the balloon will vent some of the light gas to hold at a stratospheric altitude for the desired period of time. The destruct mechanism 78 may be remotely activated with the sharp end 378 of a pivotal destruct arm to cause the platform to fall. The destruct arm 376 is spring-loaded for rapid rotation into contact with the exterior of the balloon when a hold release pin 386 is pulled from engagement in a hold/release groove 384. The release pin 386 may advantageously be controlled with a control wire 388 also appropriately activated through the circuit board upon receipt of remote signals through the antennae 76 or from the processor. Also provided inside of the platform is a GPS antennae 390 connected to the circuit board for reception of position information from The GPS satellite system to facilitate tracking of the platform as it migrates and floats over the contiguous geographic area of coverage.

Figure 13:
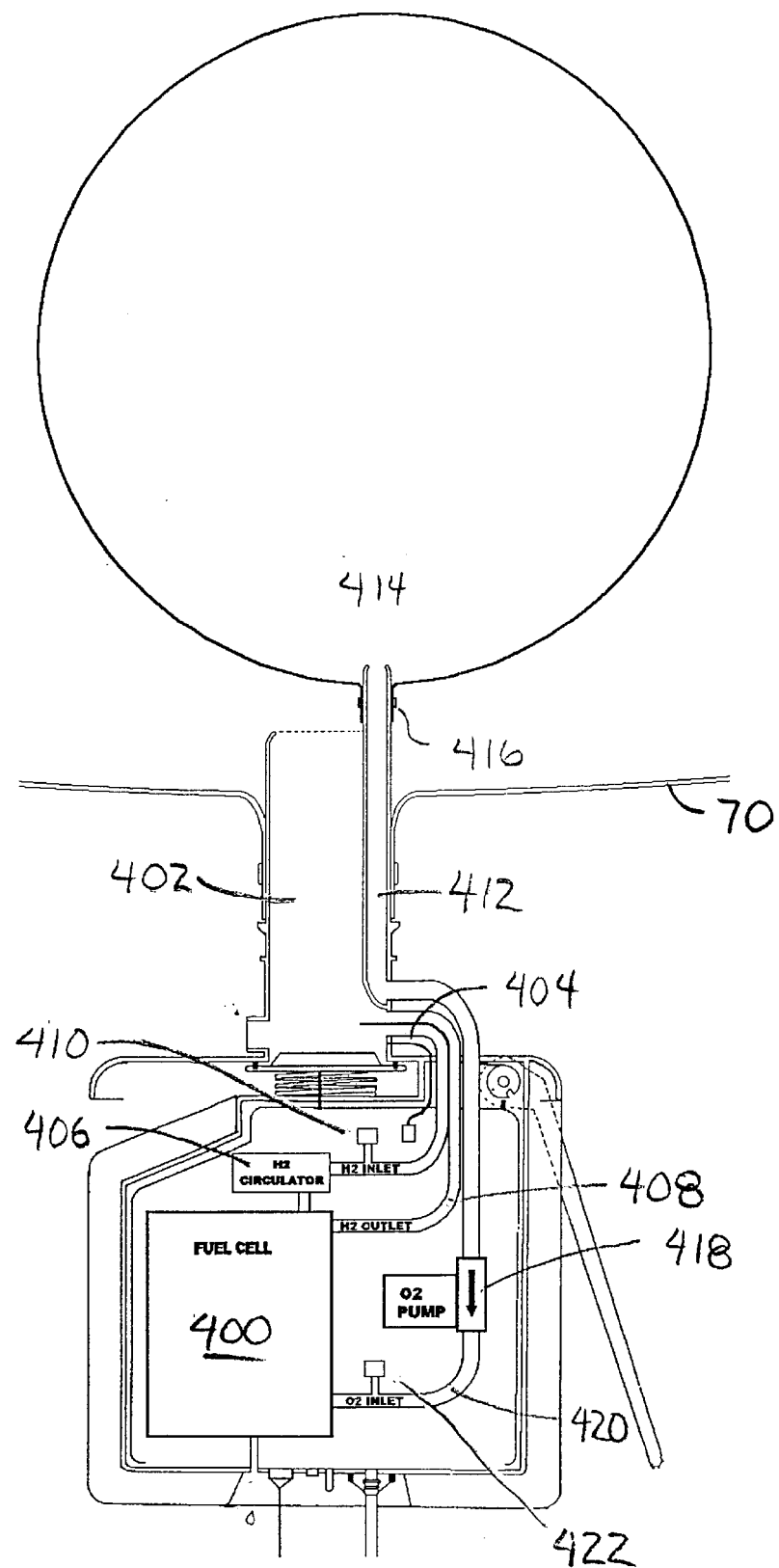
FIG. 13 is a partial cross-sectional side view of an alternative embodiment of a control and communications platform in which an alternate power source, including a hydrogen/oxygen-powered fuel cell is used in place of the batteries of the embodiment of FIG. 12.

FIG. 13 is a schematic side partial cross-section of an alternative embodiment of the platform according to the present invention in which the electrical power source for the communications circuit and controls is a fuel cell 400. Fuel cell 400 may advantageously be a proton exchange membrane (PEM) fuel cell of the type that uses hydrogen and oxygen to provide electrical power. This type of system requires a hydrogen tube 402 connecting from the source of hydrogen, i.e., the lighter-than-air balloon 70 to the fuel cell 400. A hydrogen inlet 404 is provided with a hydrogen circulator 406, which may simply be a fan 406. Thus, using the hydrogen tube, hydrogen may be extracted from the balloon and inlet into the fuel cell 400. Also, there is a hydrogen outlet 408 that is recycled back to the balloon. A hydrogen tube pressure sensor 410 is provided to appropriately monitor the hydrogen partial pressure at the fuel cell. A fuel cell of this type also requires an oxygen supply that may be provided by attaching an oxygen balloon 414 to an oxygen tube 412 so that the oxygen balloon is inside of the hydrogen balloon enclosure. The oxygen balloon is constructed to hold the oxygen at a significant internal pressure. This oxygen balloon 414 may be attached to tube 412 with a rubber band 416 and an oxygen pump 418 moves and further pressurizes oxygen from the oxygen balloon 414 into the fuel cell through an oxygen inlet 420. Again, to regulate the process an oxygen pressure sensor 422 is provided. The fuel cell reaction results in water as a byproduct. The water is maintained in a liquid state by the heat generated by the fuel cell and is desirably drained before it can freeze at the high altitudes at which the platform operates.

Figure 14:
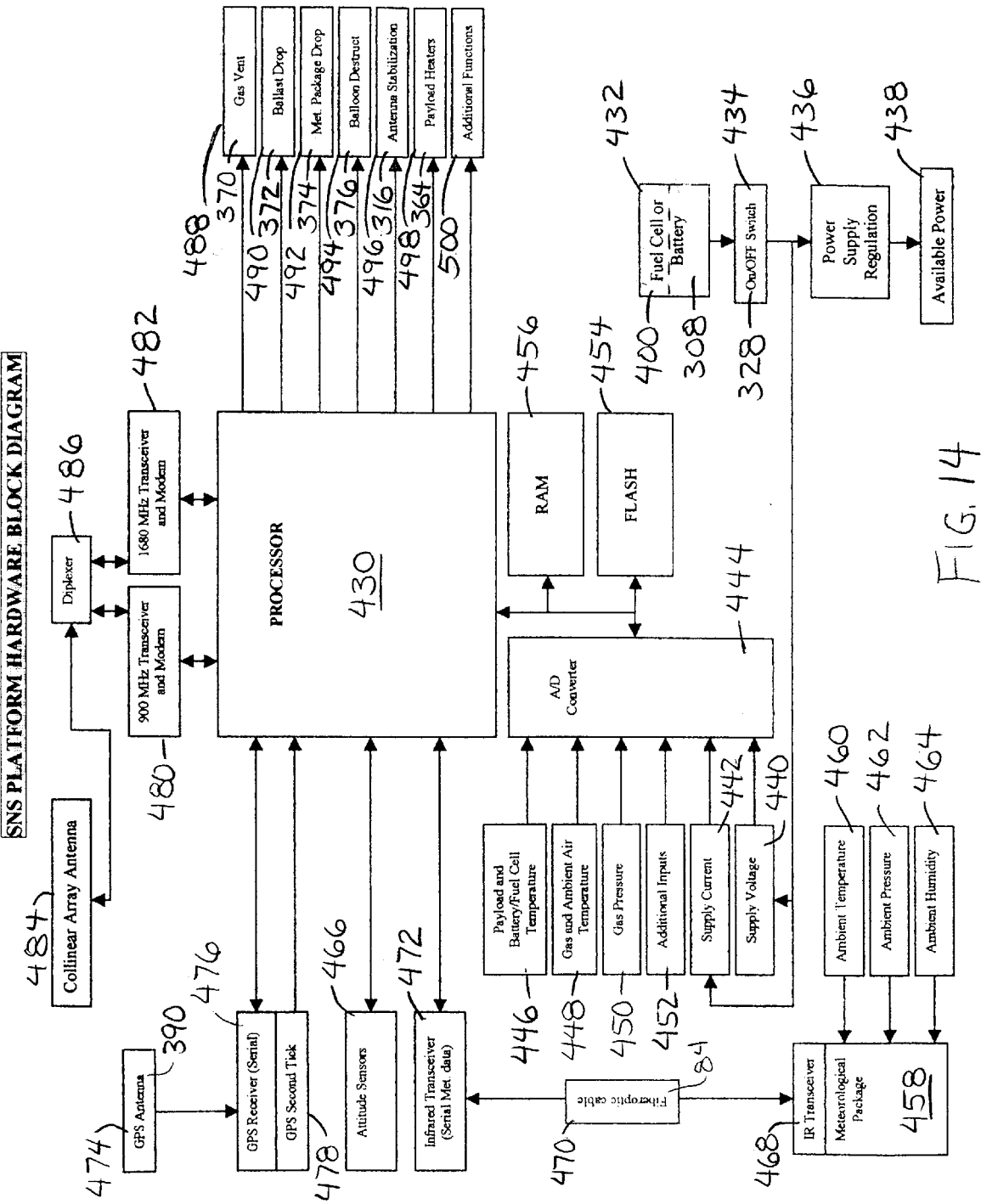
FIG. 14 is a schematic block diagram of an electronic circuit for control, sensing, and communications according to one embodiment of the invention.

FIG. 14 is a schematic block diagram of the SNS platform hardware contained within the payload box 300 and placed on or interconnected with circuit board 306. A processor 430 receives electrical signal input and provides electrical signal output, interacting with a plurality of components for both controlling the flotation altitude, temperature, balloon destruction, ballast drop, etc. of the platform and also for receiving, processing and transmitting communication signals received and transmitted to and from ground stations, personal communications devices or other information communications. Initially, block 432 represents either the batteries 308 or the fuel cell 400. Block 434 represents the on/off switch 328 to activate providing power to a power supply regulation circuit 436 with output available power 438. For clarity, individual power connections to various operational and control devices have not been shown in all instances. Power is provided to the supply voltage sensor at block 440 and current supply sensor block 442, which provide information to an analog to digital converter 444. The analog to digital converter also variously receives information from the payload and battery fuel cell temperature gauge at block 446, both gas and ambient air temperature readings at block 448 and gas pressure at block 450. Additional analog informational signals are generally represented by block 452. Digitally converted information is variously provided to and received from flash memory at block 454 and random access memory (RAM) at block 456. From A/D converter 444 and also from the flash memory 454 and from RAM memory 456, the processor has access to all the various input control data. During the ascent of the SNS platform, the meteorological package represented by block 458 receives appropriate weather information including ambient temperature 460, ambient pressure at 462 and ambient humidity at 464. The antenna stabilization 316 represented by block 496 may rely upon the attitude sensor information that is part of the SNS platform control system at 466 to stabilize the antenna 76. Information sensed or gathered by the meteorological package 458 is transmitted. For example, the infrared transceiver 468 through a fiberoptic cable at block 470 corresponding to the physical fiberoptic cable 84 and a processor infrared transceiver 472 by which serial meteorological data is transferred to the processor 430 for appropriate transmission to ground terminals during the ascent of the SNS platform with the meteorological package 458 attached. A GPS antennae block 474, corresponding to physical GPS antennae 390, communicates through a GPS receiver 476, indicated as a serial port and further synchronized with a GPS clock or seconds tick at block 478. Thus, the position at particular times is provided to the processor. This positioning information is coordinated with the other meteorological input for determining wind speeds steering any part of the ascent, thereby corresponding those wind speeds to particular altitudes and geographical locations during the ascent.

Communications are controlled by processor 430, preferably using both a 900 MHZ transceiver and modem 480 and a Gateway transceiver and modem 482 signal to and from co-linear array antennae 484 are interfaced through a diplexer 486 control information received at co-linear array antennae 484, therefore transferred through the diplexer and one of the appropriate frequency transceivers to the processor 430 with input information from ground signals and also from input information from the onboard sensors as provided through A/D converter 444, the GPS position information from 476, the GPS time information 478 and the attitude sensor information 466, various functions of the SNS platform can be controlled. Including the gas vent at block 488 corresponding to the gas vent actuator 370. Also the ballast drop is controlled at block 490 corresponding to the physical ballast drop actuator 372. The meteorological package drop controlled schematically at block 492 corresponding to the package drop actuator 374. The balloon destruct control is depicted at block 494 corresponding to the destruct actuator 376. Antennae stabilization may be affected according to controls at block 496 corresponding to the antennae stabilization mechanism 316. Payload temperature controls, both heating and cooling, may be controlled at block 498 corresponding to heaters and coolers 364. Additional functions as may be additionally included, are provided with controls at block 500.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A free floating constellation communications system comprising:

a plurality of lighter-than-air platforms comprising at least a first platform and a second platform; said first and second platforms comprising a communications signal transceiver and being free floating without any longitudinal and latitudinal position control; and a plurality of communications devices within a contiguous geographic area, at least one of said communications devices having communications capability with said communications signal transceivers;

wherein said at least one of said communications devices is capable of handing off communication with said first platform to said second platform as said first platform moves out of a communication range of said at least one of said communications devices, and wherein said free floating constellation communications system provides a line-of-sight coverage of wireless data to a population on a contiguous landmass and said plurality of lighter-than-air platforms are launched in a manner such that when in an operating range of 60,000 to 140,000 feet there is substantially a relative distance between said plurality of lighter-than-air platforms.

2. A free floating constellation communications system (CCS) of claim 1, further comprising:

an altitude regulator device;

plurality of geographically spaced-apart platform launching sites from which said plurality of platforms can be launched;

a plurality of ground terminals; and a network of communications links interconnecting at least some of said ground terminals to one another.

3. The free floating constellation communications system of claim 2, wherein said regulator is operatively connected to regulate said platform to float within the stratosphere of the Earth.

4. The free floating constellation communications system of claim 2, wherein a predetermined altitude range within which said plurality of platforms are regulated to float comprises a range of about 70,000 feet to about 100,000 feet.

5. The free floating constellation communications system of claim 2, wherein said regulator regulates the floating of said platform within a predetermined altitude range and comprises a quantity of contained gas having a density less than the density of air within said predetermined altitude range and a controllable vent by which a portion of said quantity of contained gas can be released to reduce the buoyancy of said platform.

6. The free floating constellation communications system of claim 2, wherein said regulator comprises a quantity of high density material carried onboard said platform and a release device by which a portion of said high density matter can be released to increase buoyancy of said platform.

7. The floating constellation communications system of claim 2, wherein said regulator comprises:

a controllable gas vent;

a controllable ballast release device;

an altitude determining mechanism; and a control signal processor device connected with said transceiver, said altitude determining mechanism, said gas vent and ballast release so that the altitude can be adjusted.

8. The free floating constellation communications system of claim 2, wherein said communications system of said plurality of spaced-apart ground terminals comprise a transceiver.

9. The free floating constellation communications system of claim 8, wherein at least one of said spaced-apart ground terminals comprises a network operation center.

10. The free floating constellation communications system of claim 9, wherein the network operation center comprises circuitry for controlling a predetermined operation of the platform.

11. The free floating constellation communications system of claim 2, further comprising a network operation center (NOC) connected to said network of communications links.

12. The free floating constellation communications system of claim 11, wherein said NOC is connected to at least some of said plurality of ground terminals with a hub and spoke arrangement of communications links.

13. The free floating constellation communications system of claim 11, wherein said NOC is connected to at least some of said plurality of ground terminals with a mesh arrangement of communications links.

14. The free floating constellation communications system of claim 2, wherein said network of communications links interconnecting said ground terminals comprises connections to ground lines.

15. The free floating constellation communications system of claim 2, wherein said network of communications links interconnecting said ground terminals comprises space satellite communications links.

16. The free floating constellation communications system of claim 2, wherein said network of communications links comprises platform-to-platform communications links.

17. The free floating constellation communications system of claim 1, further comprising a tracking device, wherein said tracking device comprises:

a directional antenna; and a directional antenna aiming mechanism responsive to GPS coordinate data for selectively aiming said directional antenna at one or more of said plurality of platforms.

18. The free floating constellation communications system of claim 17, wherein said tracking device comprises:

a directional antenna; and a directional antenna aiming and gain tracking mechanism for aiming said directional antenna at a selected platform according to a communications signal strength between said selected platform and said directional antenna.

19. The free floating constellation communications system of claim 1, wherein said plurality of platforms comprise a lighter-than-air device selected from the group consisting of a balloon, a blimp, an aerostat, a zeppelin, an airship, a dirigible, a weather balloon, ajimsphere, a hot air balloon, a sounding balloon and a meteorological balloon and combinations thereof.

20. The free floating constellation communications system of claim 1, wherein said plurality of platforms comprise rubber balloons.

21. A free floating constellation communications system as in claim 1 wherein said platforms comprise zero-pressure balloons.

22. A free floating constellation communications system as in claim 1 wherein said platforms comprise internal air bladder balloons.

23. A free floating constellation communications system as in claim 1 wherein said platforms comprise adjustable volume balloons.

24. The free floating constellation communications system of claim 1, wherein said platforms comprise hdrogen-filled balloons.

25. A free floating CCS as in claim 1 wherein said communications devices comprise pagers.

26. A free floating CCS as in claim 1 wherein said communications devices comprise advanced messaging devices.

27. A free floating CCS as in claim 1 wherein said communications devices comprise wireless telephones.

28. A free floating CSS as in claim 1 wherein said communications devices comprises telemetry devices.

29. A free floating CSS as in claim 1 wherein said communications devices comprises equipment tracking units.

30. A free floating CSS as in claim 1 wherein said communications devices comprises personal tracking units.

31. A free floating CCS as in claim 1 wherein:

a) said platform comprises a rapid descent mechanism; and b) said platform is disposable.

32. A free floating CCS as in claim 1 wherein:

a) said platform comprises a balloon;

b) said platform comprises a rapid descent mechanism; and c) said balloon is replaceable for recovery and reuse of said transceiver.

33. The free floating CCS of claim 1, wherein said communications signal transceiver comprises circuitry capable of communications using Frequency Division Multiple Access (FDMA) protocol.

34. Free floating CCS of claim 1, wherein said communications signal transceiver comprises circuitry capable of communications using Time Division Multiple Access (TDMA) protocol.

35. The free floating CCS of claim 1, wherein said communications signal transceiver comprises circuitry capable of communications using Code Division Multiple Access (CDMA) protocol.

36. The free floating CCS of claim 1, wherein said communications signal transceiver comprises circuitry capable of communications using the ReFLEX protocol.

37. The free floating CCS of claim 1, wherein said communications signal transceiver comprises circuitry capable of communications using the Flex protocol.

38. The free floating CCS of claim 1, wherein said communications signal transceiver comprises circuitry capable of communications using the POCSAG paging protocol.

39. The free floating CCS of claim 1, wherein said communications signal transceiver comprises circuitry capable of communications using the ERMES paging protocol.

40. The free floating constellation communications system of claim 1, further comprising:
    an altitude determining mechanism;
    a source of meteorological data; and
    controls for adjusting the altitude of a platform into a wind velocity and direction determined according to said meteorological data.

41. The free floating constellation communications system of claim 1, further comprising:
    an attitude sensor onboard at least one said plurality of platforms; and
    a steerable antenna coupled to at least one of said communications signal transceivers and attached to at least one of said plurality of platforms, said steerable antenna having stabilization controls for stabilizing said steerable antenna in a direction from said platform provides consistent ground coverage over said geographic area.

42. The free floating constellation communications system of claim 41, further comprising an aim control operatively associated with said steerable antenna and said altitude sensor for selectively changing the position of the coverage area of said antenna to facilitate filling gaps of coverage over said geographic area.

43. Free floating constellation communications system of claim 1, wherein at least one of said platforms comprise:
    an unmanned free balloon; and
    a payload box having a total weight less than six pounds and exterior surfaces with predetermined areas and that has a weight to size ratio of no more than three ounces per square inch on any surface of the package, determined by dividing the total weight in ounces of the payload box by the area in square inches of its smallest exterior surface.

44. The free floating constellation communications system of claim 1, wherein at least one of said plurality of platforms further comprises an altitude regulator operatively connected to regulate the platform to float within a predetermined altitude range after initial ascent;
    wherein said altitude regulator further comprises:
        a quantity of high density material; a device for determining the altitude of said platform, wherein said device for determining the altitude of said platform comprises a global positioning system (GPS) receiver; and a material release mechanism for releasing a portion of said quantity of high density material.

45. The free floating constellation communications system of claim 1, further comprising:
    a hydrogen gas enclosure for holding a quantity of hydrogen;
    an onboard electrical power source on at least one of said platforms, wherein said on-board electrical power source comprises a fuel cell interconnected with said hydrogen gas enclosure for receiving hydrogen as a component of the fuel for said fuel cell; and
    an altitude regulator attached to said platform to regulate the altitude of said platform within a predetermined altitude range, said altitude regulator comprising:
        an altitude determining mechanism;
        a controllable vent from said gas enclosure and vent controls operatively coupled with said altitude determining mechanism for venting of said hydrogen gas for regulating the altitude of said platform; and
        a controllable ballast release attached to said platform to release ballast for regulating the altitude of said platform.

46. The free floating constellation communications system of claim 45, wherein said controllable vent and vent controls operatively coupled thereto further comprise at least one Nickel-Titanium (NiTi) element mechanically coupled to said control vent and operatively connected to said electrical power source for selectively receiving and not receiving electrical power to thereby selectively change the length of said NiTi element for opening and closing said controllable vent.

47. The free floating constellation communications system of claim 45, further comprising a meteorological package connected to said platform through a fiber optic link to said transceiver thereby substantially preventing electrical arcing between said meteorological package and said transceiver when said platform moves through electrically charged clouds.

48. The free floating constellation communications system of claim 1, further comprising a tracking system capable of tracking one or more of said plurality of platforms.

49. The free floating constellation communications system of claim 1, further comprising a rapid deflation system for removing a platform from the air upon malfunction or improper location of the platform.

50. A free floating constellation communications system comprising:
    a plurality of lighter-than-air platforms comprising at least a first platform and a second platform, each of said first and second platforms comprising a communications signal transceiver and being free floating without any longitudinal and latitudinal position control; and
    a plurality of communications devices within a contiguous geographic area, at least one of said communications devices having communications capability with said communications signal transceivers;
    wherein said at least one of said communications devices is capable of receiving communications from said communications signal transceiver of said first platform and said communications signal tranceiver of said second platform, but hearing communications from only one communications signal transceiver and said plurality of lighter-than-air platforms are launched in a manner such that when in an operating range of 60,000 to 140,000 feet there is substantially a relative distance between said plurality of lighter-air-platforms.

51. A free floating constellation communications system comprising:
- a plurality of lighter-than-air platforms comprising at least a first platform and a second platform, each of said first and second platforms comprising a communications signal transceiver and being free floating without any longitudinal and latitudinal position control; and
- a plurality of communications devices within a contiguous geographic area, at least one of said communications devices having communications capability with said communications signal transceivers;
- wherein said first and second platforms dynamically assign new frames in which to transmit communication signal from said communications signal transceiver as the platforms drift such that a comunications device receives communications signals from only one communications signal transceiver in a particular frame and said plurality of lighter-than-air platforms are launched in a manner such that when in an operating range of 60,000 to 140,000 feet there is substantially a relative distance between said plurality of lighter-than-air platforms.

52. A method of communicating using a free floating constellation communication system comprising:
- providing a communication device for communicating wit lighter-than-air platforms;
- communicating with a first lighter-than-air platform when the communication device is in a communication range of the first-lighter-than-air platform,
- communicating with a second lighter-than-air platform when the communication device moves out of the communication range of the first lighter-than-air platform, wherein the first and second lighter-than-air platforms each comprise an altitude regulator device and a communications signal transceiver and wherein the first and second lighter-than-air platforms are free floating without any longitudinal and latitudinal position control and said plurality of lighter-than-air platforms are launched in a manner such that when in an operating range of 60,000 to 140,000 feet there is substantially a relative distance between said plurality of lighter-than-air platforms.

53. The method of claim 52, wherein the communication device comprises a pager.

54. The method of claim 52, wherein the communication device comprises a an advanced messaging device.

55. The method of claim 52, wherein the communication device comprises a wireless telephone.

56. The method of claim 52, wherein said altitude regulator device regulates the altitude of said platform to within a predetermined altitude range of between about 60,000 feet and about 140,000 feet.

57. The method of claim 52, wherein said altitude regulator device is operatively connected to regulate the platform to float within the stratosphere of the Earth.

58. The method of claim 52, wherein said altitude regulator regulates the floating of said platform within a predetermined altitude range and comprises a quantity of contained gas having a density less than the density of air within said predetermined altitude range and a controllable vent by which a portion of said quantity of contained gas can be released to reduce the buoyancy of said platform.

59. The method of claim 52, where in said altitude regulator comprises a quantity of high density material carried onboard said platform and a release device by which a portion of said high density matter can be released to increase buoyancy of said platform.

60. A method of communicating using a free floating constellation communications system comprising:
- providing a plurality of lighter-than-air platforms comprising at least a first platform and a second platform, each of said first and second platforms comprising a communications signal transceiver and being free floating without any longitudinal and latitudinal position control; and
- communicating with a communication device having communications capability with said communications signal transceiver, wherein said first and second platforms dynamically assign new frames in which to transmit communication signals from said communications signal transceivers as the platforms drift such that a communication device receives communications signals from only one communications signal transceiver in a particular frame and said plurality of lighter-than-air platforms are launched in a manner such that when in an operating range of 60,000 to 140,000 feet there is substantially a relative distance between said plurality of lighter-than-air platform.

61. The method of claim 60, wherein the communication device comprises a pager.

62. The method of claim 60, wherein the communication device comprises a an advanced messaging device.

63. The method of claim 60, wherein the communication device comprises a wireless telephone.

64. The method of claim 60, wherein said altitude regulator device is operatively connected to regulate the platform to float within the stratosphere of the Earth.

65. The method of claim 60, wherein said altitude regulator regulates the floating of said platform within a predetermined altitude range and comprises a quantity of contained gas having a density less than the density of air within said predetermined altitude range and a controllable vent by which a portion of said quantity of contained gas can be released to reduce the buoyancy of said platform.

66. The method of claim 60, wherein said altitude regulator comprises a quantity of high density material carried onboard said platform and a release device by which a portion of said high density matter can be released to increase buoyancy of said platform.

67. A method for providing communication service comprising:
- providing a first lighter-than-air platform;
- providing a second lighter-than-air platform wherein the first and second lighter-than-air platforms each comprise an altitude regulator device and a communications signal transceiver and wherein the first and second sight-than-air platforms are free floating without any longitudinal and latitudinal position control;
- providing a plurality of communications devices within a contiguous geographic area, at least one of said communications devices having communications capability with said communications signal transceiver, wherein said at least one of said communications devices is capable of handing off communication with said the platform to said second platform as said first platform moves out of a communication range of said at least one of said communications devices and wherein said free floating constellation communications system provides a line-of-sight wireless data coverage to a population on a contiguous landmass and said plurality of lighter-than-air platforms are launched in a manner such that when in an operating range of 60,000 to 140,000 feet there is substantially a relative distance between said plurality of lighter-than-air platforms.

68. The method of claim 67, wherein the communication device comprises a pager.

69. The method of claim 67, wherein the communication device comprises a an advanced messaging device.

70. The method of claim 67, wherein the communication device comprises a wireless telephone.

71. The method of claim 67, wherein said altitude regulator device is operatively connected to regulate the platform to float within the stratosphere of the Earth.

72. The method of claim 67, wherein said altitude regulator regulates the floating of said platform within a predetermined altitude range and comprises a quantity of contained gas having a density less than the density of air within said predetermined altitude range and a controllable vent by which a portion of said quantity of contained gas can be released to reduce the buoyancy of said platform.

73. The method of claim 67, wherein said altitude regulator comprises a quantity of high density material carried onboard said platform and a release device by which a portion of said high density matter can be released to increase buoyancy of said platform.

* * * * *